H. A. HERR.
AUTOMATIC CONTINUOUS CENTRIFUGAL FILTERING MACHINE.
APPLICATION FILED OCT. 19, 1914.
1,246,267.
Patented Nov. 13, 1917.
9 SHEETS—SHEET 9.
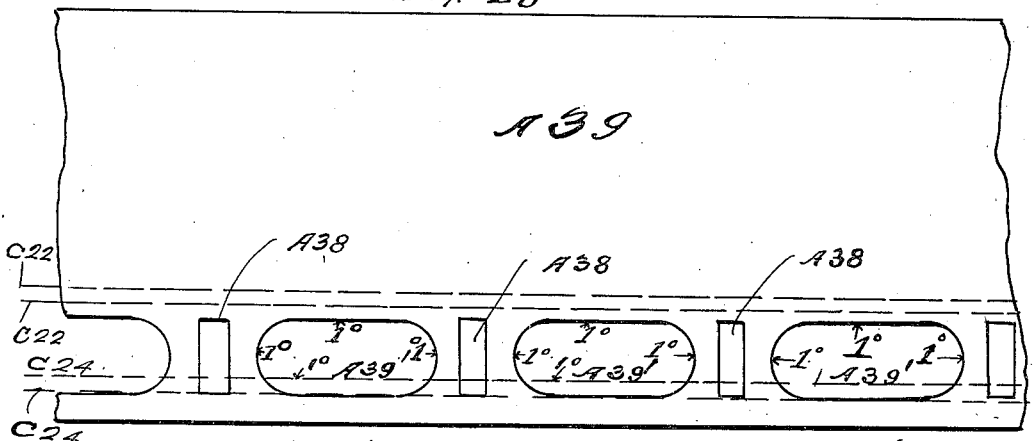
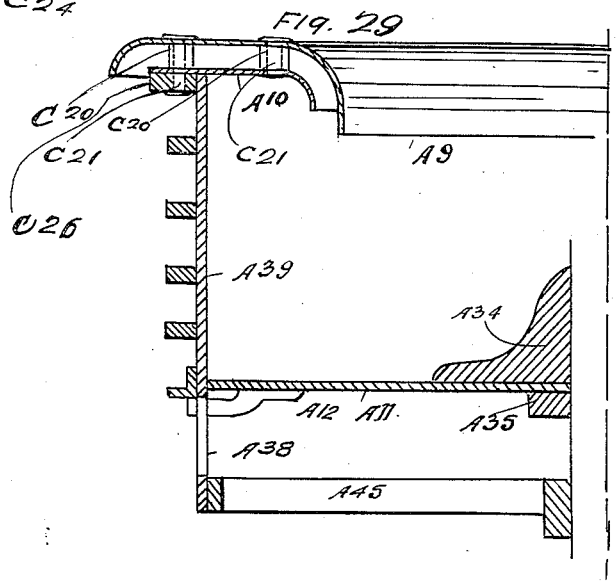
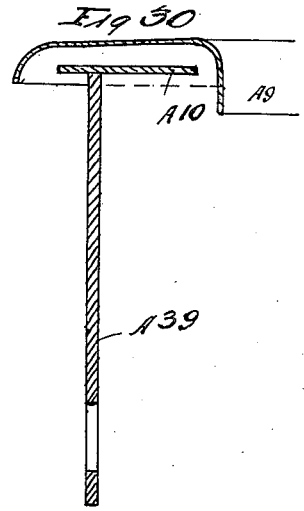

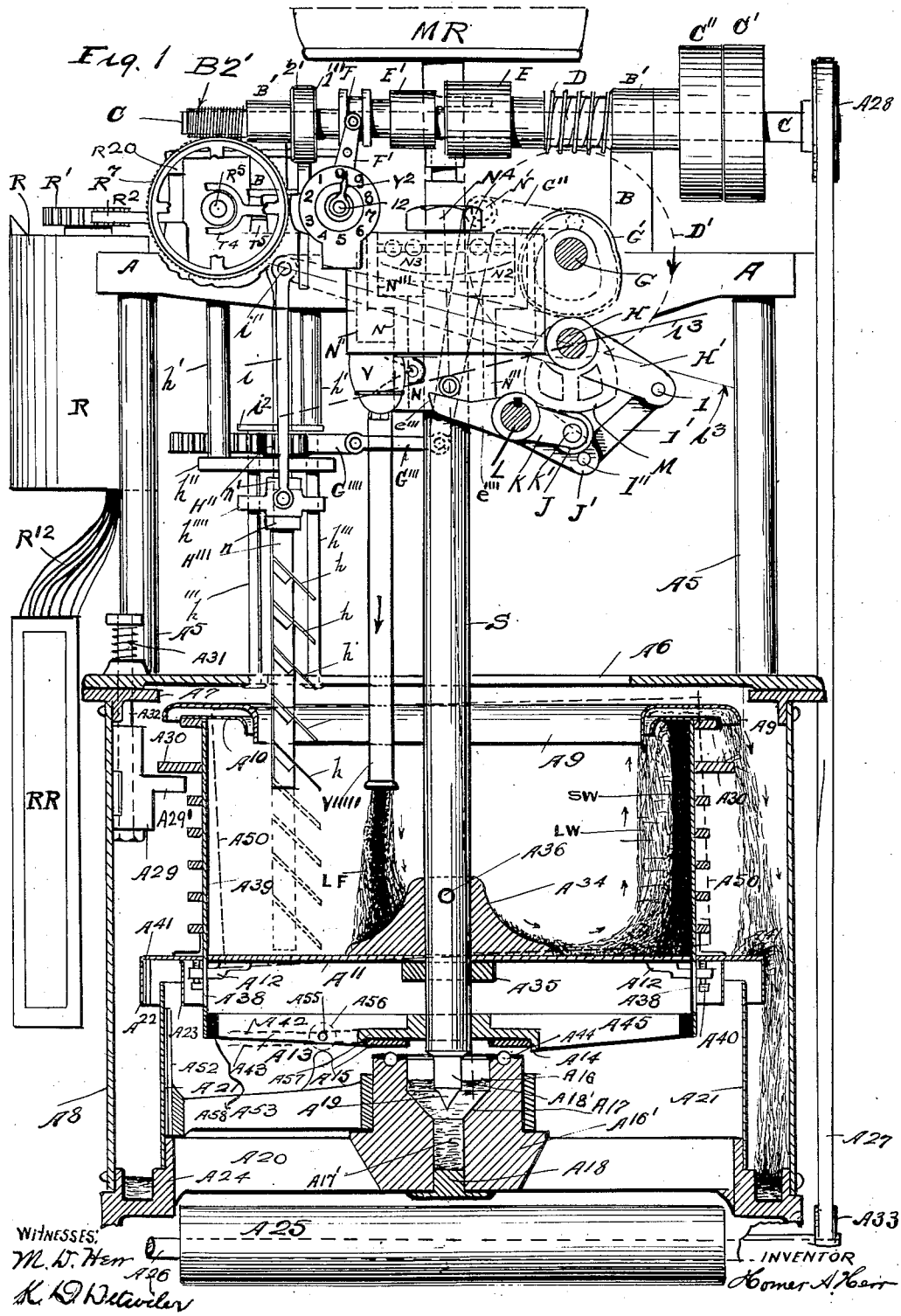

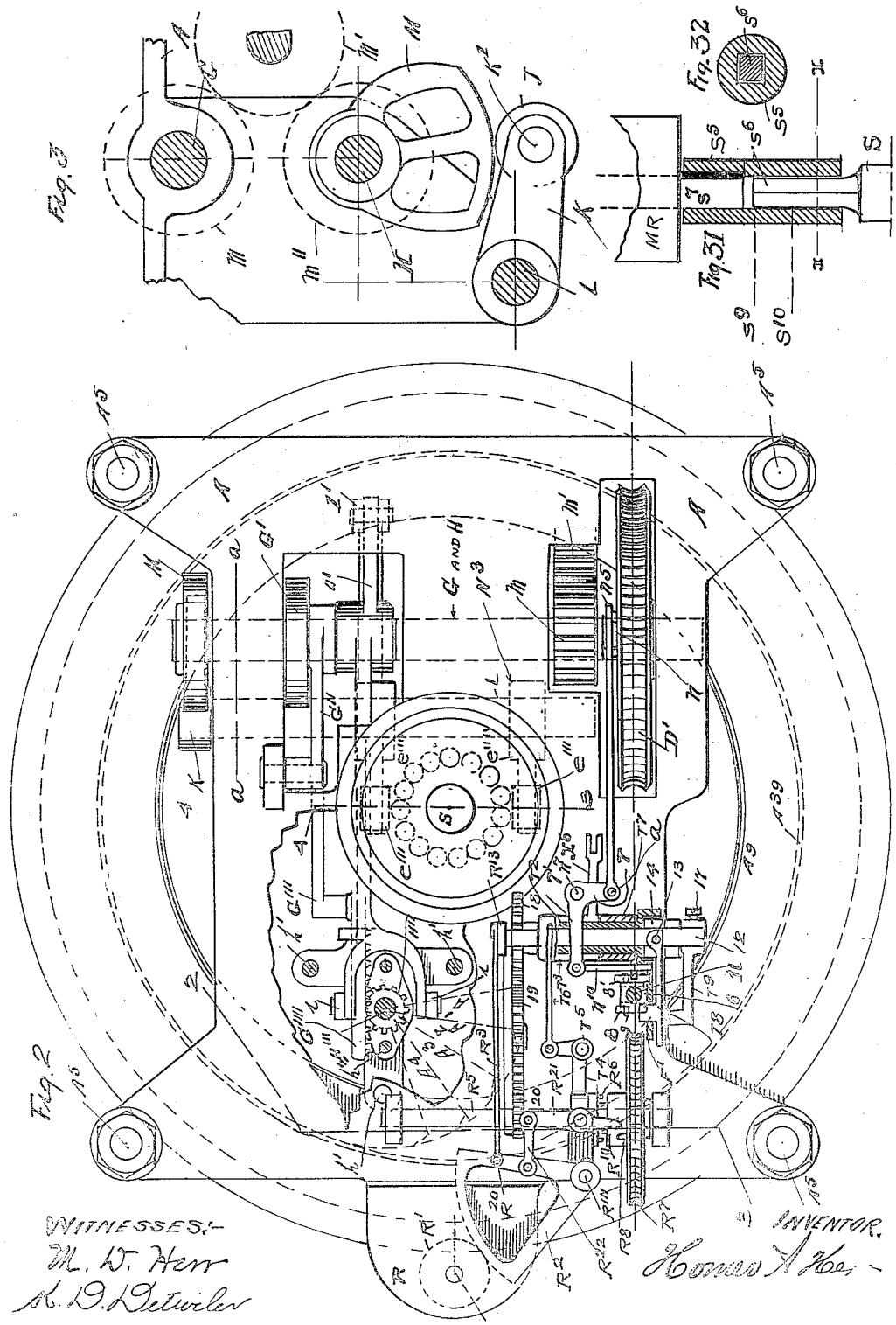

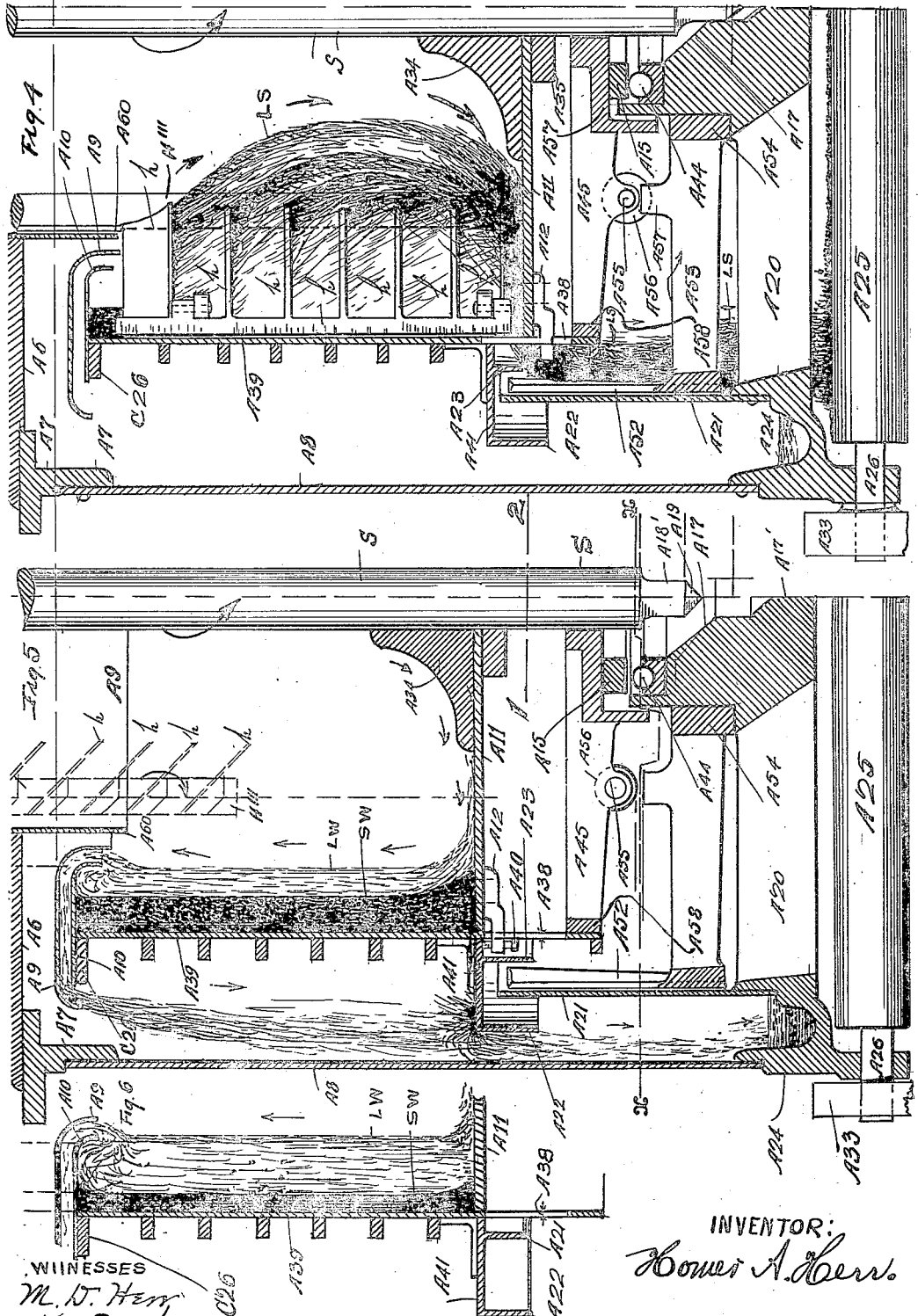

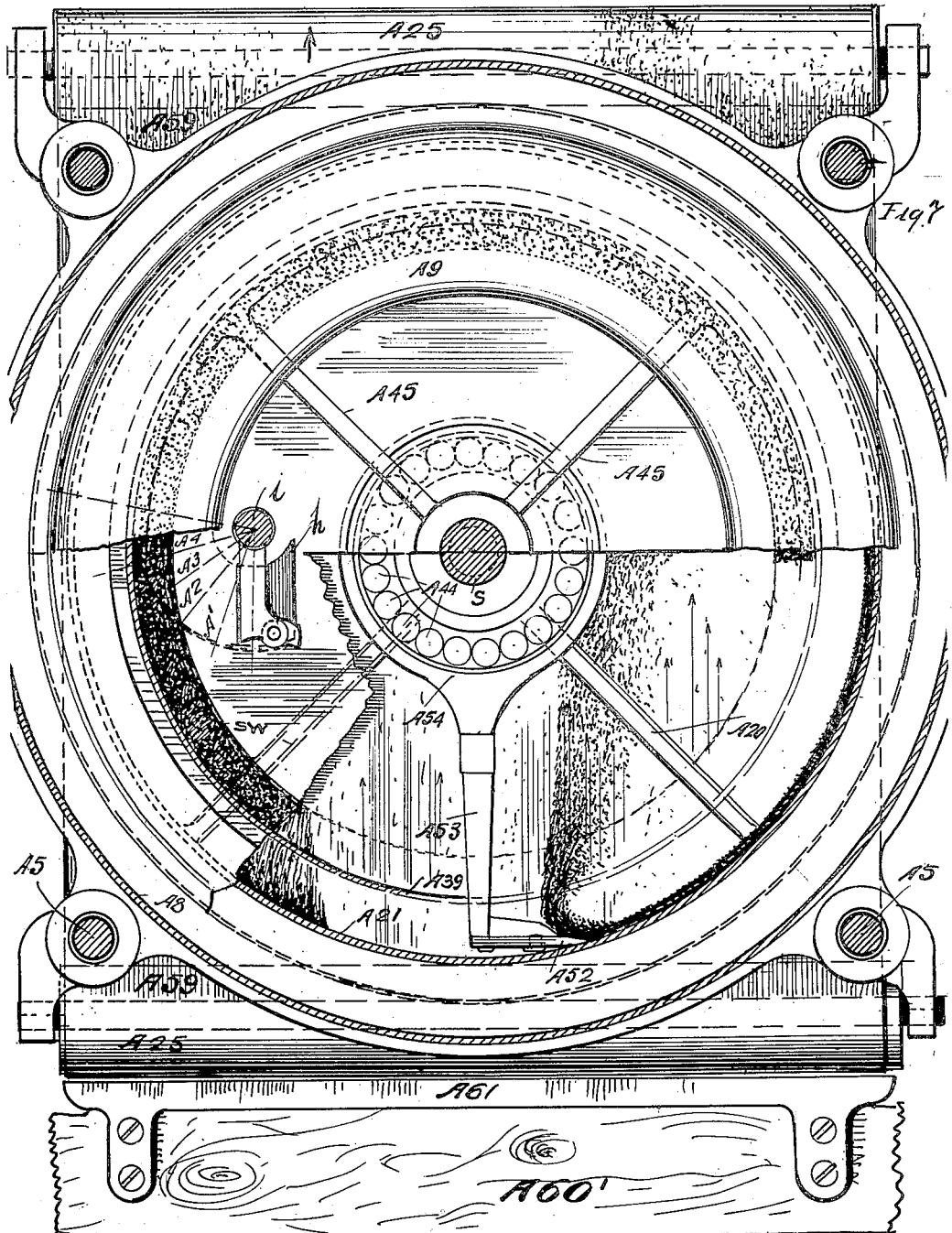

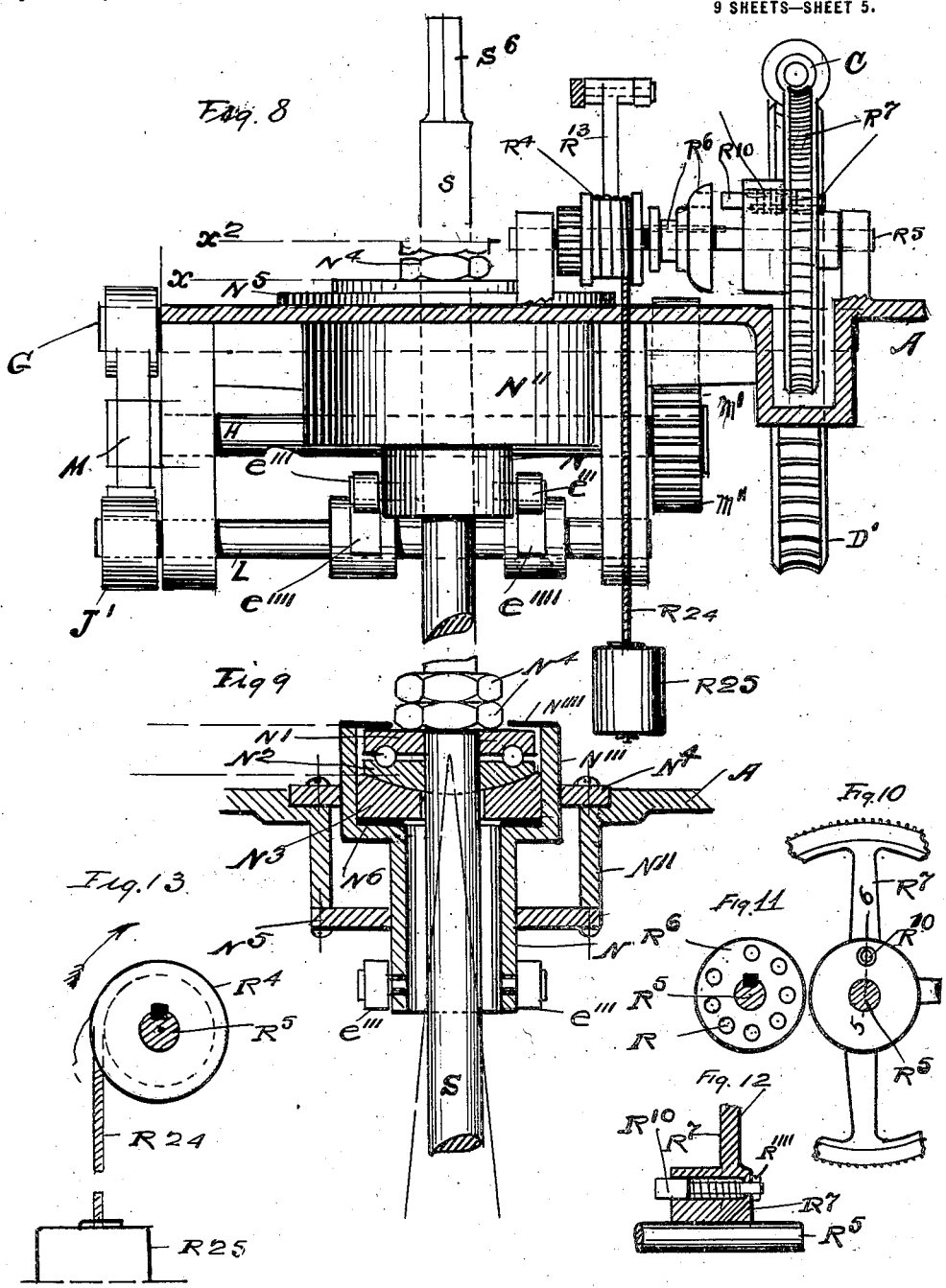

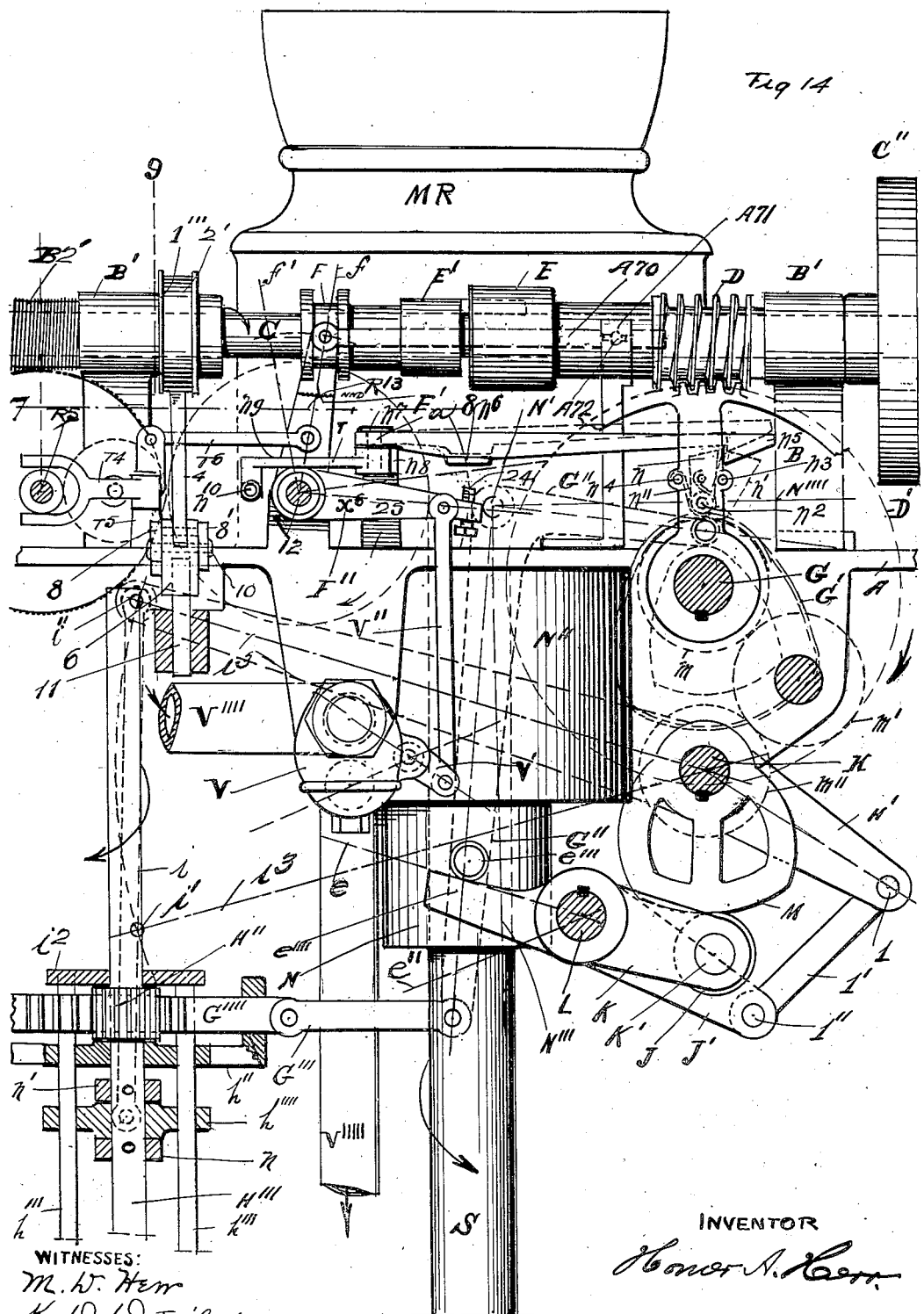

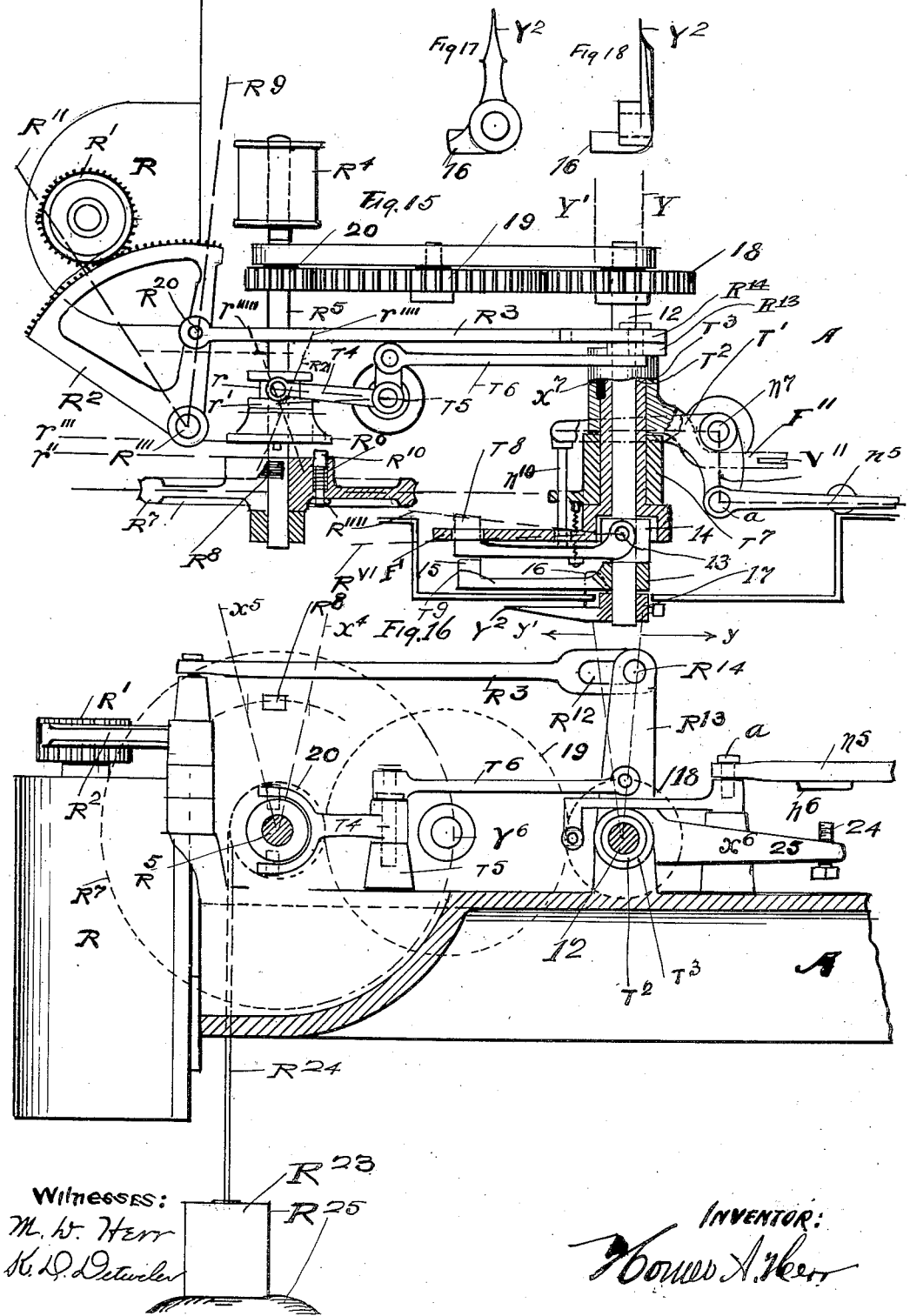

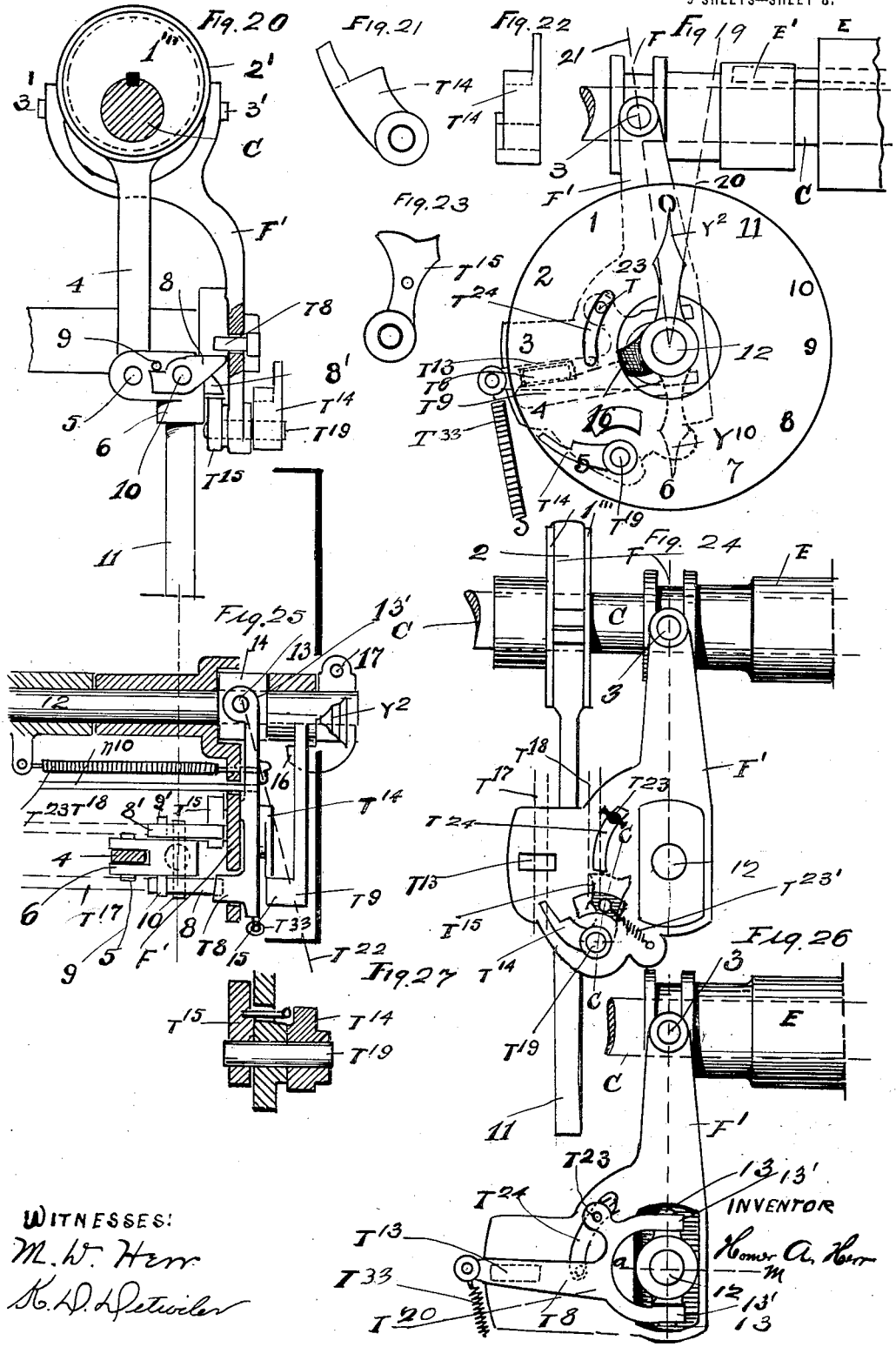

UNITED STATES PATENT OFFICE.

HOMER A. HERR, OF PHILADELPHIA, PENNSYLVANIA.

AUTOMATIC CONTINUOUS CENTRIFUGAL FILTERING-MACHINE.

1,246,267.  Specification of Letters Patent.  Patented Nov. 13, 1917.

Application filed October 19, 1914. Serial No. 867,450.

*To all whom it may concern:*

Be it known that I, HOMER A. HERR, citizen of the United States, residing at 1912 N. 22 St., Philadelphia, in the county of Philadelphia and State of Penna., have invented certain new and useful Improvements in Automatic Continuous Centrifugal Filtering-Machines, of which the following is specification.

My invention has reference to centrifugal machines and consists of features fully set forth in the following specification and the accompanying drawings forming part thereof.

The object of my invention is to provide a machine to separate liquids from their associated solids when the latter are of a greater specific gravity than the former, by centrifugal force.

This is accomplished in materials of this character without the use of drain cloths or filtering fabric.

It is well known that centrifugal force acts in proportion to the specific gravity of the respective materials and this will always carry the denser and heavier substance the greater distance from the axis of rotation.

My invention comprises an imperforate basket or cylinder at the upper end of which I provide a ring to arrest any tendency on the part of the solids to pass out over the basket top; co-acting with this ring I have a second ring preferably inclining inwardly from the top perimeter of the basket and extending down into the basket more or less. This latter ring not only extends downward into the basket, but has a flanged circumferential extremity or edge which overlaps the said former ring.

As the solids associated with the unfiltered liquid become separated from the liquid they become impacted and walled up on the inner perimeter of the basket and on this wall the liquid travels up and into the conductor formed by the said two rings, a channel or liquid passageway being formed by separating the said two rings as shown.

While the separation is almost instantaneously accomplished yet it is evident that the liquid will not pass freely through the said passageway until the wall of liquid is sufficient to extend inward to a depth to overreach the vertical plane of the said inner ring after which it will pass freely through the above named passageway over the basket top and into the supplemental or curb chamber formed by the spacing between the outer wall of the basket perimeter and the inner wall of the curb-forming ring.

These two rings provide in effect and in fact a trap which extends entirely around the top of the basket perimeter and concentric with the basket center.

By reason of the solids being heavier than their associated liquids immediately on the unseparated mass contacting with the bottom of the basket, in the function of feeding the chamber, such mass is thrown toward the inner perimeter of the basket wall and the solids become separated from their associated liquid, the former walling up on the basket wall and the liquid walling up on the solids until the volume of the liquid is sufficient to pass out of the passageway already referred to. It is evident, therefore, that the capacity of each individual machine, or basket load, is the limit of filtered material that will impact on the basket wall until the inner radius of this material will approximate the radius of the ring in direct contact with the top of the basket wall.

In combination with the liquid discharging channel formed by the two rings described, I provide a means to clean the impacted solids from the inner wall of the filtering basket. This cleaning is done intermittently and at predetermined times. This means consists of a cleaner having a series of deflectors and blades which are automatically put into and out of action. This scraper can be made in many ways. As shown it is similar to that shown in my application No. 454,063, Sep. 21st, 1908. I do not however limit myself to this structure.

It is an important matter in separating by a centrifugal machine that there is as little oscillation as possible to the basket at high speed. I, therefore, suspend my basket for rotation at high speed having a bearing support only at its upper end. It is also important in the function of cleaning that the basket should have no motion of eccentricity in order that my cleaners will have a uniform scrape on the inner basket wall. I, therefore, provide a journal for the bottom of the basket shaft and put the shaft in this journal while the basket is at slow speed and during the time of cleaning the basket, and while the basket is at high or purging speed the said shaft is removed from this journal, thus permitting eccentricity of motion to the basket shaft and the basket in obedience to the laws of gravity, if the material is not distributed with perfect uniformity around the center of the basket shaft, which condition is not possible.

A further feature of my invention is the means to control the high or purging speed and the slow or cleaning speed.

This consists, in combination with an electric motor, the electrical controller and resistances, of an automatic means to regulate the controller. I do not show details of the motor, controller or resistances as they are, of course, all old, but the means to regulate them by mechanism in connection with a centrifugal basket mounted to rotate at varying speeds is part of my present invention, as I thereby predetermine to a nicety a high speed for purging and a slow speed for cleaning.

I further show a speed brake for automatically arresting the speed of the basket quickly and acting in conjunction with the motor controller. The object of this speed brake is to reduce the speed within the time the basket is being moved down to its lower limit so that by the time the cleaner is put in action the speed of the basket is at a practical unloading speed.

In combination with my valves, the means for operating them and the cleaning of the basket, I show a time regulating device, whereby I can regulate the feeding of unseparated material to the basket to any desired maximum of volume for any time necessary to meet varying conditions of initial saturation.

This mechanism does not differ materially from that shown in my application hereinbefore noted, but its functional relation is different, as it controls feeding valves as well as the time for feeding. This regulating of the time for feeding is a matter of very great importance in an automatic machine for separating by centrifugal means.

A further feature of my present invention is to provide a supplemental scraper or cleaner which coacts with the scraper in the basket and a conveyer under the machine insures the taking away of the purged material from under the basket.

While I show the said perimeter of my basket as having a movable bottom, which when lowered uncovers egress ports or holes in the said perimeter to permit the discharge of the solids yet I do not wish it understood that I limit myself to the employment of this movable bottom to so uncover the said ports.

Other features of my invention will be referred to hereinafter in this specification.

In the drawings like parts are referred to by marks or figures of a corresponding kind in the different views.

Figure 1 is a part elevation of the front of the machine and a vertical section through the basket.

Fig. 2 is a plan of the machine with the prime shaft removed.

Fig. 3 is a section on line a—a of Fig. 2 showing the cam for operating the rock shaft which raises the basket and permits it to be lowered.

Fig. 4 is a vertical section through one half of the basket showing the manner in which the solids are discharged therefrom after being separated from their associated liquid.

Fig. 5 is also a vertical section through one half of the basket showing the manner in which the liquids are discharged and the solids walled up on the inner face of the basket perimeter.

Fig. 6 is a vertical section of the basket showing the initial action of the liquids and the primary solids wall.

Fig. 7 shows a general plan of the basket with all the top mechanism removed; one half of the figure being taken from above the basket showing the basket top and a portion of the remainder of the view showing the bottom of the basket with the solids walled thereon and the remaining portion showing a supplemental cleaner and scraper for depositing the material on the ribbon conveyer under the machine.

Fig. 8 is a section on line 2—3 of Fig. 2.

Fig. 9 is a section on line 3—4 of Fig. 2.

Fig. 10 is a broken view of the worm wheel actuated by the prime shaft for primarily operating the timing finger through its clutch of which the actuating worm wheel therefor forms a part.

Fig. 11 is a view of the sliding clutch spool.

Fig. 12 is a section on line 5—6 of Fig. 10.

Fig. 13 is a view of a chain drum for carrying a chain or cord for reseating the timing finger.

Fig. 14 shows an enlarged view of the prime shaft, the feed valve for the liquid feeding, connections for raising and lowering the basket shaft and the links and levers for operating the prime shaft clutch and the timer clutch. The timer is removed from this view.

Fig. 15 is a horizontal section on line 7—8 of Fig. 14 showing the timer clutch and the link for operating the electrical controller, as well as the means for operating the trip for the prime shaft clutch.

Fig. 16 is a side view of the electrical controller in position with the segmental rack which operates it and the link which operates the segment; also the clutch for timer control and the reseating weight for the timer.

Figs. 17 and 18 are different views of the timer finger.

Fig. 19 is a side view of the indicator for timing the feed to the basket and the clutch arm which it controls.

Fig. 20 is a section of the prime shaft on line 9, Fig. 14, showing the eccentric for operating the dogs and an end view of the clutch arm controlled by the timer.

Figs. 21 and 22 are side and end views respectively of the outside interponent.

Fig. 23 is a side view of the inside interponent.

Fig. 24 is a side elevation of the clutch arm for moving the clutch on the prime shaft, showing the outside and the inside interponents in their relative positions.

Fig. 25 is a horizontal section through the timing shaft, or on line $a$—$m$ of Fig. 26.

Fig. 26 is the same elevation as shown in Fig. 24 with the interponents removed and showing the oscillating lever which moves the outside interponent in position to be engaged by its operating dog.

Fig. 27 is a section on line $c$—$c$ of Fig. 24 showing the outside and inside interponents in position on the clutch moving arm.

Fig. 28 is a section showing the perimeter of my basket.

Fig. 29 is a section of the basket when the bottom is up and the solids egress ports sealed.

Fig. 30 shows a modified way of making the top trap. It will be noted that the inner trap plate is not deflected.

Fig. 31 is a section on the motor sleeve which engages slidingly the upper end of the basket shaft. Fig. 32 is a section on line X—X of Fig. 31.

A is the main bedplate of the machine. B B are two standards fixed to this bedplate and carry bearings B' B' in which prime shaft C is carried. C' is a fast and C'' is a loose pulley on the prime shaft. D is a worm and D' is a worm wheel rotating in the direction of the arrow shown. E is a clutch disk of the friction type, E' a clutch spool carrying an annular groove F in which groove are friction rollers or equivalent means carried by the arms F' and through which the clutch spool E' is actuated so as to engage its co-acting member E.

I do not go into details of this clutch construction, as any form or style of clutch will respond to the requirements of my device, and therefore, hereinafter in this specification, in the interests of brevity, I will consider E as forming one clutch jaw and E' as its co-acting jaw.

G is a secondary shaft carrying cam G'. This cam is the cleaner actuator and oscillates the bell crank lever G'' and therethrough lever or link G''' on rack G'''', thus oscillating pinion H'' of shaft H'''. This latter shaft is the cleaner carrying shaft. The cleaner consists of a stem having a series of deflecting blades $h, h, h, h, h$, etc. I do not limit myself to the specific form of cleaner mechanism as I could make it in many different ways any one of which would answer the requirements of my invention.

In Fig. 1 two rods $h', h'$ are shown supporting frame $h''$ from the bed plate A. $h''', h'''$ are two guide rods for the pinion retainer and rod carrier $h''''$. This carrier is connected with the lever H', Figs. 1, and 14 by the link $i$. $i''$ and $i'$ indicate the two extreme positions of the pivot pin for this link.

The collars $n$ and $n'$ are held to the shaft H''' by pins or screws and, therefore, are free to rotate with the said shaft while the holder $h''''$ slides vertically with the shaft H'''. These collars form top and bottom thrust bearings and retainers for the said shaft holder $h''''$. While the shaft is down the said shaft holder is also down and is thus brought nearer the point of stress caused by the action of the cleaner blades $h, h, h, h$, in the interest of an efficient, strong construction.

The cap $i^2$ forms the top of a case for the pinion H'' and a key in the pinion sliding in a groove in the rod H''' permits the pinion at all times to remain in the same horizontal position while the rod H''' is moving vertically in carrying the cleaners down and then again in carrying them up after they have performed their function of scraping the basket wall. The radial lines $i^3$ Fig. 14 show the two extreme movements of the lever H' in vertically reciprocating the rod which carries the cleaners as set out. The upper position, or when the pivot pin holding the link aforesaid is at $i''$ is the position the said lever occupies when the basket is at high speed and the material therein is being purged; in this position the cleaner blades $h, h, h, h$, are raised as shown in the solid lines in Fig. 1. When the cleaner actuating links have their pivot pins at $i'$, the cleaner blades are down, as shown in dotted lines in Fig. 1.

It will, therefore, be clearly understood that when the links $i$ $i$ operate the cleaner blades vertically through the lever H' the said lever rocks on the shaft H freely as a journal therefor. This shaft is actuated by the gear $m''$ through the intermediate $m'$ and primary gear $m$. This latter gear is on the shaft G which is actuated by and carries the worm wheel D'.

Save at its contact with the moving worm D on the primary shaft I show this worm wheel only by its pitch line and as a dotted circle.

Now as the shaft G is rotated by the worm wheel D', the spur $m$ rotates the intermediate spur $m'$ and the latter actuates the spur $m''$. This spur $m''$ is fixed to the shaft H as is also the cam M; the said cam is thus rotated. The friction roller J is in contact with the cam M and the lever K is keyed to the shaft L, the latter being thus oscillated by the movement of the said lever. The lever J' is also keyed to the shaft L, whereby, as the cam M oscillates the lever K from radial line $e$ (Fig. 14) to $e''$ the lever J', through link I' oscillates lever H' from pivot point $i''$ to $i'$ and so drops the cleaner blades as has been set out.

$e''''$ are two lever arms keyed to the shaft L and $e'''$ are two friction rollers carried by the lower part of the shaft support N, this shaft support being in fact a reciprocating plunger with an upper and a lower cylinder and held in guides as will be explained presently more in detail. Now as the shaft L is oscillated as set out the two arms $e''''$ engage on the under side of the said friction rollers $e'''$ and raise the basket shaft by raising its support. It will be recalled that there are two of these lever arms $e''''$ and two rollers $e'''$ as shown on the plan view, Fig. 2, one on each side of the said basket shaft support. As the shaft G rotates the cam G', which actuates the lever G'' rotates and this rotation oscillates this lever on its pivot N' and through the means already set out the cleaner shaft and blades $h,h,h,h,h,$ are lowered, and are moved rotatably until they reach successive radial positions indicated by the dotted lines shown in Figs. 2 and 7 and indicated by numerals $A^1, A^2, A^3$ and $A^4$, the position $A^4$ being the position of the cleaners $h$ when the lever G'' has its depending arm in the position indicated by N''', Fig. 14 only. The cam G' has thus raised the position of the upper arm of the bell crank G'' to line N''''. In this position of the lever G'' and the cleaners $h$ the walls of the basket are cleaned and the lever H' has the pivot pin for the link $i$ at point $i'$, or down.

As the cam G is further rotated the cleaners are raised by the raising of the lever H'.

I have now described how the cleaner is put in action by being first lowered into the basket zone of the machine and how it is taken out of action by being raised out of this zone of the basket separating action.

I have also set out how the basket shaft support N is controlled by the lever $e''''$ and how this latter is operated by the cam M, shaft H, intermediate gear $m'$, gear $m$, shaft G, worm wheel D' and worm D on the prime shaft.

It will be understood that the worm D is entirely controlled by the clutch E' and E and this worm will, therefore, only rotate when the said clutch jaws are engaged. The prime shaft C is in continuous rotation and the jaw of the said clutch E' being fixed by key to this shaft is also in continuous rotation. This keyway is of the usual construction permitting of longitudinal motion while rotating. Thus when the clutch jaw occupies the position shown in the dotted line $f$ (Fig. 14) the worm D rotates.

It is the law of my machine that the material to be separated shall be fed to the basket gradually and while the basket is at high speed and that immediately upon the speed being reduced the material supply shall be shut off. In this particular it differs essentially from my former invention hereinbefore referred to. I, therefore, control the valve for feeding the material to the basket simultaneously with the moving of the clutch on the prime shaft whereby the jaws E' and E are controlled. When the clutch actuating arms F' oscillate from $f'$ to $f$ the valve for feeding the unseparated material to the basekt must be shut off. This clutch action must immediately precede the slowing down of the basket and the cleaning thereof.

V is the feeding valve, being of the quick acting gate type. V' is an arm rigid with the valve gate and V'' is a link connecting this valve arm with the lever F'' which lever is operated by the clutch arm F' both being rigid on the same pivotal member. V''''' is the discharge pipe from the valve V for the unseparated material and V'''' is the feed pipe therefor.

Now when the clutch jaws E' and E are engaged the adjustments are so that the valve V has its gate closed. That is to say in the position shown in the drawing, Fig. 14, the clutches E and E' have just been closed and the basket shaft support N is commencing to go down and, of course the valve V is sealed against the passage of any unseparated material.

After the cleaner and the basket shaft holder N have gone down and the basket has been cleaned of filtered solids, in the manner to be as yet partly described when considered in combination with the cleaners, then the valve V is opened and the speed of the basket becomes accelerated to maximum or purging speed. The flow of the unseparated mass is thus and then resumed as shown in Fig. No. 1.

I have now described how the valve for feeding the unseparated mass to the basket is opened as the basket is raised and at the time the speed is accelerated and how it is closed as the basket is lowered and speed is reduced for basket cleaning, and I have also set out how I control the cleaner both in its downward and upward movements and in its oscillation to and from the basket perimeter. I will now describe the construction of the basket support.

S is the basket shaft, Figs. 1, 8, 9, 14 and others. This shaft at its upper end carries two nuts $N^4$. N' is a circular plate, $N^2$ is a disk or ball race having a convex lower surface. The plate and disk have opposed ball grooves operating as ball retainers. $N^3$ is a concave ring fitted to the convex face of $N^2$. $N''$ is a depending ring or cylinder integral with the body of the bed plate A and on the under side thereof. $N^5$ is a cap plate held to $N''$ by screws in a firm and rigid manner, Fig. 9 only. $N'''$ is an integral part of N but of increased diameter. N and $N'''$ forming the case for retaining the concavo-convex shaft support $N^2$ and $N^3$. The cap plates $N^4$ and $N^5$ become guides and retainers for the shaft support formed by the two integral cylinders N and $N'''$. The concavo-convex contact faces of the two disks $N^2$ and $N^3$ permit the supported shaft S to swing to any degree in an eccentric motion that the laws of gravity will exact if the load in the basket is not uniformly distributed around the center of the basket shaft.

It is not possible in practice to have the material in the basket so distributed to the center of the basket shaft as to absolutely free the basket from some tendency to eccentricity and this tendency when the basket shaft is held in a fixed bearing induces oscillation of the basket and of the material therein. This oscillation is not conducive to perfect separation and it is to avoid this tendency that I suspend the basket while purging or filtering.

The upper portion of the shaft S, which is operated by an electric motor is connected therewith by a loose coupling so as to permit of eccentric rotation as just set out. The upper and enlarged portion of the shaft support $N'''$ and N carries oil for lubrication and to shield the oil I provide a disk $N''''$ above and a gasket $N^6$ under the flat face of the convex support $N^3$, Fig. 9.

The slow speed I accomplish in my present invention by an electric motor, using a controller and field and armature resistances for slowing down the motor from 1200 R. P. M. the high speed to 100 R. P. M. the slow speed and cleaning speed. The controller, resistances and motor are of course old, but my controlling them for the purpose of separation in combination with my devices is new.

R is the controller, Figs. 15, 16, 2 and 1. $R^{12}$, Fig. 1, designates the conductors leading to the resistances shown only in their case R R, so for the purpose of this specification I will consider R R the resistances and $R^{12}$ conductors. R' is a pinion carried by the shaft of the controller. This controller shaft in the usual way controls the resistances. $R^2$ is a segmental rack carried on pivot $R'''$ which is fixed to the bed plate of the machine A. The radial line $R^9$ indicates the position for the slow speed of the motor and $R^{11}$ for the high speed; so that when the segment $R^2$ operates the controller to the lowest point of speed or greatest point of resistance the radial line of the rack will be at $R^9$. $R^3$ is a link united to the segment aforesaid at the one end and at the other to the arm $R^{13}$. The arm $R^{13}$ is integral with the hub or boss $T^3$ and the hub $T^2$ is integral with the clutch moving arm F'. The key $X^7$, Fig. 15 only, holds together hub $T^3$ and hub $T^2$ and therefore the arm $R^{13}$, which it will be remembered, is integral with the hub $T^3$, will move in unison with the clutch arm F' when this said clutch arm moves in the direction of arrow $f$, Fig. 14.

Through the link $R^3$ the segment $R^2$ will in this way be oscillated toward the radial line $R^9$ which is the position of the slow speed of the motor and greatest resistance in the rheostat. In this position of the parts and action of the motor the clutches E and E' become engaged and the basket shaft S descends, as does the cleaner shaft $H'''$ as already fully set out.

The worm wheel D' by the action of the worm D is rotated and while this worm wheel makes one full revolution the basket shaft goes down, the basket is cleaned, and the shaft $H'''$ and cleaner $h, h, h, h,$ are raised again. Just as the worm wheel D' comes to within about 6° of making a complete revolution a yielding dog $n$ on one of the arms of the said wheel will engage the hook on the end of the link $n^5$, Fig. 14, and move it forward in the direction of the rotation of the said worm wheel D'. The link $n^5$ will therefore oscillate the bell crank T,T' and the rod $n^{10}$ will push the oscillating lever $T^8$ until the projecting lug thereon is free from engagement with the hole $T^{13}$, Figs. 24 and 26, of the clutch arm F', whereupon it will be free to snap down against the outside interponent $T^{14}$, Figs. 20, 24 and 25 and 1. The shaft $T^{19}$ will in this way be instantly oscillated against the tension of the spring 23' as this shaft carries the outside interponent as well as the inside interponent $T^{15}$, to a position indicated by the vertical parallel lines $T^{18}$, Figs. 24 and 25, and when in this position the inside interponent is in the path of the inside reciprocating dog 8' and as this dog is continuously reciprocating vertically it will instantly engage the said interponent. Now as shown the shaft $T^{19}$, which carries the two said interponents, is journaled in the flat side of the clutch arm F' and as the dog 8' is moved down it engages on the top side of the said interponent $T^{15}$ and opens the clutch jaws E and E' by oscillating the said arm F from line 20 to 21, Fig. 19.

To make the action of the opening of the clutch jaws E and E' a little more easily understood in connection with the co-acting mechanism I beg to say that in Figs. 1, 14, 20 and 21, $I'''$ is an eccentric disk keyed to the shaft C. 2' is an eccentric strap around said disk, 3' are pins holding the lever F' in engagement with the groove F of the clutch E', 6 is a dog holder, 4 a link rigid with the said eccentric strap 2' and held to the said dog holder by pivot pin 5, 11 is a guide and retaining rod rigid in the dog holder, 6, 8 an outside dog and 8' an inside dog held to the dog holder by a common pin 10 for the two said dogs as shown.

9 is a resisting thrust pin for the dog 8 and 9' is a resisting thrust pin for the dog 8'. The dog 8 in action pulls up and the pin 9 prevents any oscillation of the dog 8 beyond its working contact.

The pin 9' does the same for dog 8' and therefore the latter thrust is down. Now the link 4 on the strap 2' is in continuous vertical reciprocation as the disk I' is in continuous eccentric rotation, being keyed to shaft C, which is continuously rotating through the fast pulley thereon.

14 is a collar free on shaft 12 and carrying the pivoted lever 13' thereon, the two pins 13, 13 thereon holding the said collar to the said lever, as shown in Figs. 15, 25 and 26. $T^9$ is a lever also free on the said shaft 12. It carries a lug on its outer extremity. $Y^2$ is an indicating finger having a lug 16 integral therewith. The indicating finger can be adjusted to any position or any degree on the shaft 12 and when set to the desired position has a locking or clamping screw 17 to hold it to such position. Of course this locking means can be made in many different ways and in Fig. 25 I show it as a split boss with a clamping screw and in Fig. 15 it is shown as a simple set screw.

16 is a lug integral with the pointing finger $Y^2$, and this lug, it will be seen in Figs. 15 and 25, is in the rotary plane of the arm $T^9$ and in assembling the parts must be put on the under side thereof. 18 is a spur gear on shaft 12 and fixed thereto so that it rotates with the rotation of the said shaft. 19 is an intermediate gear and 20 is a gear on shaft $R^5$. This shaft $R^5$ carries a clutch jaw $R^6$ which latter engages with its co-acting clutch jaw $R^{10}$. The character of clutch is immaterial, but the specific construction of the one I here show is best illustrated in Figs. 10, 11 and 12 and to be taken in connection with Figs. 15 and 16.

Any one of the holes $R^{6'}$ can receive the pin of the clutch jaw $R^{10}$; when pin and hole co-incide as the clutch spool $R^6$ is moved toward the said pin, which is fixed into the boss of the worm wheel $R^{7'}$, and as the said wheel is rotated. The nut $R''''$ permits of the pin of the jaw $R^{10}$ being adjusted as desired. The bell crank $T^4$ on its support $T^5$, through the link $T^6$ and lever $R^{13}$, Figs. 15 and 16, moves the said clutch spool or jaw $R^6$ to engagement and disengagement from its coacting clutch jaw $R^{10}$ through which means rotary motion is communicated, when so engaged, to the shaft $R^5$, spur 20, intermediate gear 19 and spur 18, shaft 12 and indicating finger $Y^2$. I have already explained that the arm $R^{13}$ is rigid with the clutch arm $F'$ and, therefore, they move in unison.

Now when the clutch arm $F'$ is moved from line 21, Fig. 19, its open position, to line 20, its closed position, the arm $R^{13}$, Fig. 16 is moved from line $Y'$ to line $Y$. In this movement it is evident that the jaws E and E' on the prime shaft C become locked and the worm D will rotate the worm wheel D'. It is equally evident that by this movement the link $T^6$ through its pivoted position on arm $R^{13}$ will swing the bell crank $T^4$ and thus move the spool $R^6$ in disengagement with the spring pin $R^{10}$ carried in the wheel $R^7$. The wheel $R^7$ rotates freely on the shaft $R^5$. By this means I arrest the movement of the finger pointer $Y^2$ as it is controlled by the clutch described.

It will thus be seen that the clutch jaws E and E' and $R^6$ and $R^{10}$ are alternately engaged and disengaged. The former controls the lowering and raising of the basket shaft and the latter the timing finger for predetermining the separating period; the former also regulates the period for basket cleaning.

The operation of this part of my mechanism is as follows: We will assume that the material in the basket has just been unloaded and the basket cleaned as set out hereinbefore, that the lever K, Fig. 1 has raised the basket shaft support N and $N'''$, through contact with the friction rollers $e'''$ and $e'''$. The dog $n$ on the worm wheel D' will then engage the hook of the link $n^5$ which is pivoted to the small arm T of the bell crank T, T', Fig. 15 and since the push rod $n^{10}$ is pivoted to the large arm T' of the said bell crank lever T, T', the said push rod will press against the inner side of the lever $T^8$ until said lug $T^8$ is forced out of engagement with the opening $T^{13}$ of the lever F' by the rod $n^{10}$, whereupon the spring $T^{33}$ will snap the said lever $T^9$ against the outside lever $T^{14}$ of the rod $T^{19}$ and thus swing the interponent $T^{15}$ in the vertical path of the dog 8' (see Figs. 19, 20, 24 and 25) in which position the said interponent will be engaged by the said dog; the lever F' will thus become oscillatable by this engagement and when oscillated will open the clutch jaws E and E' stopping the wheel D'. The arm F'' is also simultaneously oscillated and the set screw 24 of the said arm contact at $n^6$ with the lever $n^5$ and the hook on the end of the latter becomes disengaged from the dog $n$ on the said worm wheel D', whereupon the spring $n''$ will snap thereunder, as shown in Fig. 14, where $n'$ indicates the changed position of the dog $n$, after which the said worm wheel D' will be free for another rotation in the succeeding cycle of movements of the machine.

The link V'' opens valve V simultaneously with the opening of the clutch jaws E and E' as set out and the unseparated material is now free to pass into the basket, as shown in Fig. 1 and after the time has expired for the separation the following results are accomplished.

We will assume that it takes a six minute flow of the unseparated material to permit the solid wall to form on the inner side of the basket perimeter. I will accordingly set the finger $Y^2$ to the 6 numeral on the indicator face as shown in Fig. 19 and indicated by $Y^{10}$. It will take 6 minutes for this finger $Y^2$ to travel from numeral 6 to 0. It will be recalled that the shaft 12 which carries the finger $Y^2$ is operated by the worm wheel $R^7$ through the clutch $R^6$, $R^{10}$, shaft $R^5$, spur wheel 20 and wheels 19 and 18 as set out, and it will be further recalled that immediately the clutch jaws E and E' are disengaged and clutch $R^6$ and $R^{10}$ is engaged the timing finger $Y^2$ commences to rotate, the speed of the motor being accelerated (as will be described presently) the filtering valve V opened and the initial separating commenced. Now as the finger $Y^2$ rotates the lug 16 thereon will engage on the under side of the lever $T^9$, and as the lever $T^8$ is now resting on the interponent $T^{14}$, as shown in dotted lines Fig. 19, further movement of the finger $Y^2$ will lift the lever $T^9$, and as the lever $T^8$ when resting on the interponent $T^{14}$ is in the rotary path of the lug 15 of the lever $T^9$ the said lever $T^8$ will be thus raised until the lateral inwardly projecting lug thereon is in a position coinciding with the hole $T^{13}$, after which the spring $T^{23}$ will snap the said lug in the said hole $T^{13}$, as shown in Fig. 26.

Now it will be recalled that the eccentric I' is in constant rotation. Therefore the dog 8 is continuously reciprocating vertically and as this dog thrusts upward, Fig. 25, it will engage immediately on the under side of the lug or lever $T^8$ and pull the said lever up, and as the hole in which this lever lug is now engaged is formed in an integral part of the clutch arm F', the said arm being pivoted on shaft 12 will be oscillated from line 21 to line 20, Fig. 19, which oscillation will have closed the clutch jaws E' and E as fully set out. $T^{24}$ is an arc shaped slot in the clutch moving arm F', through which passes the pin which carries the spring $T^{23'}$. This arc shaped slot permits the lever $T^8$ to move downward relatively to the clutch arm F' when actuated by the spring $T^{33}$.

*The operation of the controller.*

As the acceleration of the motor must take place immediately on the opening of the clutch jaws E and E' and the closing of the clutch jaws $R^6$ and $R^{10}$, we will assume that the segment $R^2$ is in the position shown in Fig. 15, which has the radial line $R^9$ through the pivot $R^{20}$ of the link $R^3$, in the position for slow motor speed, which means that the full measure of field and armature resistance is on the rheostat R. This link $R^3$, which connects the arm $R^{13}$ with the segment $R^2$, Figs. 15 and 16, has a slot $R^{12}$, shown only in Fig. 16. This slot permits the lever arm $R^{13}$ to oscillate from line Y to line Y' without influencing the movement of the segment $R^2$ for motor control, but the moment the clutch jaws $R^6$ and $R^{10}$ are united, as they are simultaneously with the movement of the link $R^3$, the lugs $R^8$ of the wheel $R^7$ which is constantly rotated by worm $B^{2'}$ on shaft C, Figs. 2, 15 and 16, engage the end of the lever $R^{21}$ carried by clutch member $R^6$ as shown in Fig. 2 and the said lever through link $R^{22}$, Fig. 2, will oscillate the segment $R^2$ until the radial line $R^9$ has the position shown by the radial line R". The lever $R^{21}$ is moved to a position to be engaged by the lug $R^8$ by the closing of the clutch jaws $R^6$ and $R^{10}$. The above movement of the segment $R^2$ removes all the field and armature resistances from the motor circuit and the full force of the electrical circuit is free to go to the motor and give it high and filtering speed. This speed continues until the filtering period as predetermined by the timing finger $Y^2$ has expired and until the clutch jaws $R^6$ and $R^{10}$ are again separated and jaws E and E' are united, when the arm $R^{13}$ will pull the lever back to the position shown in Figs. 15 and 16, and thus return the segmental rack to its normal position indicated by radial line $R^9$. The resistances are now again in the circuit and the speed of the motor MR reduced. The lever actuating lugs $R^8$ on the wheel $R^7$ can be in series for actuating the controller through the lever $R^{21}$ and link $R^{22}$. Six or eight all at an equal radius from the center of the wheel $R^7$. They could be made yielding and means provided to hold them out of the path of the lever they operate if desired except in such times as they are in contact with the said lever.

The manner in which I reseat my timing finger is as follows: $R^4$ is a chain drum carrying a cord or chain $R^{24}$ and a weight thereon $R^{23}$. As the said chain drum is rigid with the shaft $R^5$, with the rotation of the latter the said drum rotates and raises the weight $R^{23}$ by winding the chain $R^{24}$ around the drum aforesaid, but the moment the clutch jaws $R^6$—$R^{10}$ are disengaged the weight will drop and reset the finger $Y^2$ by bringing the shaft 12 back to its initial position which is predetermined by the weight rest or support $R^{25}$, Fig. 16. This weight rest, or some equivalent means, must be adjusted to meet any change in time for purging, as will be apparent. As an equivalent to the weight support I could use a stop on the dial plate and let the finger $Y^2$ rotate back against this finger stop and move the stop with each change in time for filtering or purging. I have now described how I control the motor through the controller and resistances, how I lower the basket bottom, how I put the cleaners in and out of action, how I feed the unseparated material and control the feed therefor, how I put the timer in action and out of action and reset it after each predetermined time for a purge and I will now describe how the basket shaft is journaled for and at slow speed and how the basket is constructed for separating without fabric.

$A^5$ are a series of supports for holding the basket and the mechanism set out in a fixed relation to each other, the bed plate A being secured thereto above and the basket curb below. $A^6$ is a top for the basket curb held to the annular casting $A^7$, which is supported on the curb cylinder plate $A^8$. This curb plate is riveted to the ring $A^7$ at the top and at the bottom to the base ring $A^{24}$ as shown.

$A^9$ is an annular plate having its two circumferential edges bent down or deflected thus forming an inverted annular trough or basin. $A^{10}$ is an annular plate or ring having its inner circumferential edge bent down or deflected. These two rings are separated by spacing plugs of suitable form (not shown) so that the annular horizontal channel formed by their separation is about one half inch in width. Thus I form a liquid passage for any liquid passing between the two deflected annular edges. The deflecting of the outer edge of the plate $A^9$ turns the liquid down in the curb chamber as shown in Figs. 1 and 5. $A^{11}$ is the basket bottom supported on the shaft S by collar $A^{35}$ on which it rests and collar $A^{34}$, the latter held to the said shaft by the pin $A^{36}$. $A^{12}$ are a series of lugs or projections on the basket bottom $A^{11}$. These lugs pass into the holes vertically extended in the basket perimeter $A^{39}$ and slide vertically therein as the shaft is vertically reciprocated. $A^{40}$ are a series of adjusting screws resting on the under side of the ring $A^{41}$. It will be understood that as the shaft S is raised the said adjusting screws engage the face of under side of the plate $A^{41}$ and thus lift the basket from line $A^{43}$ to line $A^{42}$ or off the friction rollers $A^{44}$, and as the basket is lowered the basket frame rests on the rollers $A^{44}$. After this frame rests on the said rollers, however, the basket bottom has a still further movement vertically and the lugs $A^{12}$ during this further movement slide down in the said slots or holes $A^{38}$ aforesaid in the wall of the basket perimeter until the egress ports in the basket perimeter are exposed and uncovered, after which the solids are free to pass out the ports $A^{39'}$. These ports are shown in Fig. 28 in detail and in Fig. 4, which latter figure shows the frame $A^{45}$ as resting on the balls $A^{44}$. While the reinforcing basket frame $A^{45}$ for the perimeter thereof is in the position just set out the cleaners are lowered to the position shown in the dotted line Fig. 1 or down, and as shown in Fig. 4 they are not only down but oscillated to the extreme cleaning position $A^4$ as shown in Fig. 7.

The basket bottom $A^{11}$ is of course a ring; it fits snugly on the inner face of the basket wall $A^{39}$ so as to arrest liquid passage therebetween and in practice I would carry a seal or annular gasket to insure this sealing of the basket at this point against passing any liquid while the function of filtering is in progress.

$A^{16}$ is a cylindrical portion of the basket shaft bearing, $A^{17}$ an angular annular downwardly projecting portion of the basket shaft bearing converging centerward. $A^{17'}$ is a hole therein of uniform diameter corresponding to the diameter of the end of the basket shaft S. This hole carries an oil tight plug $A^{18}$. An oil chamber is thus formed by the bearing.

$A^{19}$ shows a V pointed end for the shaft S. When the basket is up and at high speed this V point of the shaft is out of the bearing, $A^{17'}$ and within the tapered section $A^{17}$, as shown in Fig. 1. It remains in this section while separation is going on and by this construction the basket is permitted to swing to a degree of eccentricity limited by the diameter of the said section $A^{16}$. As this eccentricity is likely to vary with different materials the diameter can be made to vary to suit such requirements in different machines.

$A^{50}$ shows the extremes of basket eccentricity that is likely in practice, Fig. 1. As already stated $A^{41}$ is a ring fixed to basket perimeter $A^{39}$ with its broad face horizontally positioned. Integral therewith or fixed thereto are two vertical rings $A^{23}$ and $A^{22}$; all these rings of course rotate with the basket; the outer ring $A^{22}$ prevents the liquid, as it passes out over the top of the basket through the trap formed by the two rings $A^9$ and $A^{10}$ from coming in contact with the solids by sealing and shielding the top of the ring $A^{21}$ and the inner ring $A^{23}$ prevents the solids passing over the top of $A^{21}$ while cleaning. The ring $A^{21}$ is stationary and fixed to the bottom casting $A^{24}$ of the machine. These rings are all shown in section in Figs. 1, 4, 5 and 6, and in the plan view Fig. 7.

$A^8$ is the outside curb ring and $A^{21}$ is the liquid collector or chamber as shown in Figs. 4, 5, 6 and 1. By consulting Figs. 4 and 7 it will be seen the cleaners $h, h, h, h, h,$ deposit the filtered solids against the inner side of the ring $A^{21}$ through the solids egress passageways $A^{39'}$, Figs. 28 and 7. In some substances viscosity will cause the material to adhere to the sides of the ring plate $A^{21}$. In order to prevent any serious clogging I provide a sweep or scraper $A^{52}$ carried on the supporting arm therefor $A^{53}$ which is in turn supported on ring bearing $A^{54}$.

Fig. 5 shows the shaft S as raised which is the purging position. Fig. 4 shows the said shaft as down or in the position it occupies when the basket is being cleaned or discharged of its purged solids. The cleaners $h, h, h, h$, are always up when the shaft S is up and down when the said shaft is down as shown in Figs. 5 and 4. Now as the solids are thrown against the wall of the ring plate $A^{21}$ the sweep $A^{52}$ will engage them and throw them off of the said ring plate and this always occurs when the shaft is down and can occur at no other time.

The operation of the cleaner arm $A^{53}$ is accomplished by the collar $A^{56}$ on rod $A^{55}$, the latter of which is carried on the arm $A^{45}$ of the basket supporting ring $A^{57}$. This basket supporting ring consists of a center ring $A^{57}$ having integrally connected radial arms $A^{45}$ and a basket engaging ring $A^{58}$, Figs. 4, 5 and 7. This cleaner is put in action at the time the solids are passed through the ports $A^{39'}$ in the perimeter of the basket and when it is so in action it is engaged by the collar $A^{56}$ already described. $A^{59}$, Fig. 7, is a ribbon conveyer carried by rollers $A^{25}$, $A^{25}$ and $A^{61}$ is the scraper for cleaning the said conveyer.

As the shaft S is raised the basket support is also raised after the lugs on the basket bottom $A^{12}$ have slid up in the slots $A^{38}$ for such a distance that the adjusting screws $A^{40}$ have engaged the ring $A^{41}$.

The movement of the basket bottom $A^{11}$ is about 2½ inches and the movement of the basket rim support $A^{58}$ is about ¾ inch which indicates that the basket support is raised about ¾ inch off the balls $A^{44}$ when the basket is up and also indicates that the egress ports $A^{39'}$ are uncovered about 1¾ inches when in solids cleaning action. When purging or filtering the collar $A^{56}$ is out of the path of the lug $A^{57}$ so the former can rotate with its supporting arm $A^{45}$ at high speed without contacting with the latter at this time.

$A^{25}$ is a roller for one end of the ribbon conveyer and as the material is cleaned from the side of the basket ring $A^{21}$ it is discharged on this conveyer. There are two of these rollers $A^{25}$ mounted on shaft $A^{26}$, one at either end of the machine and the ribbon is wrapped around them so that their rotation gives a rectilinear movement to the ribbon forming the material conveyer proper. $A^{27}$ is a belt operated by the pulley $A^{28}$ on the prime shaft C and $A^{33}$ is a pulley on the primary of the two rollers $A^{25}$. Therefore this ribbon conveyer is always in action when the prime shaft C is rotating.

A further feature of my present invention is to provide a brake which is put into action as the basket shaft is going down, but is disengaged when the basket is up and being rotated at purging speed. It consists of the following: $A^{30}$ is a ring of enlarged diameter on the upper end of the basket perimeter. $A^{29}$ is a sliding plug or member held by the rod $A^{32}$ supported from the top of the curb $A^6$ and having a variable frictional resistance inherent in the spring $A^{31}$. Now as the basket is going down in the period preparatory to unloading the parts are so adjusted that the said ring will rest on the flange or shelf $A^{29'}$ of the member $A^{29}$ and the friction thus automatically induced will quickly arrest the speed of the basket until it is brought to unloading speed. As the basket ascends by the means and in the manner fully set out the ring $A^{30}$ becomes disengaged from shelf $A^{29'}$ just at the time that the motor speed is becoming accelerated to the maximum.

It will be understood that in practice I would use several members $A^{29}$, enough to balance the basket. By increasing the power of the spring $A^{31}$ I increase the friction and by decreasing this power I decrease the friction in accordance with the laws of frictional contact.

It will be seen that when the basket is up the shaft S can rotate eccentrically and when down it can only rotate in a radius concentric with a fixed center so that the vertical rotary plane of the basket perimeter is in a fixed plane during the cleaning function and at which time the cleaners $h, h, h, h$, can scrape the walls of the inner face of the said perimeter of the basket in an effectual and efficient manner. I need scarcely repeat that as the scrapers $h, h, h, h$, remove the solids from the inner face of the basket perimeter they are passed through the ports $A^{39'}$ against the inner face of the ring plate $A^{21}$ and from this ring they are removed by the supplemental scraper $A^{52}$ and placed on the conveyer under the machine, and thereafter discharged to a common conveyer (not shown) which will accommodate a series of machines according to the plan or design of the plant in which they are installed.

Following is the operation of the machine. I will assume that the material that I wish to separate has a percentage of solids to liquids of one to ten, or 10%. I will further assume that it will require 6 minutes to build a wall of separated solids on the inner surface of the basket shell before I wish to discharge the said solids as shown in Fig. 4. I, therefore, set the indicator finger $Y^2$ on the shaft 12 to numeral 6 on the dial shown in Fig. 1. To set this finger I disengage the locking screw 17, Fig. 15, so the finger can be rotated on the shaft 12 to any of the numerals on the face of the said dial without turning the said shaft. Needless to say that in setting this finger to predetermine periods for high speed separating it is turned in the direction of the numerals progressively arranged, as from 1 to 6, as the limit in the present adjustment for speed. The belt is then put on the tight pulley C' of the prime shaft C. The clutch jaws E' and E we will assume are disengaged, which is their normal position when the machine is idle. The arm F' is now in the radial position shown at $f'$, the motor is at high speed, the valve V is open, held so by the link V'' on the lever F'', the latter integral with the lever $R^{13}$, through a common sleeve boss $T^3$. With the valve V open the flow of the unseparated material to the basket is continuous, as shown in Fig. 1.

Now after the high separating speed has continued for a period of six minutes the finger $Y^2$ nears the O position of the dial, Fig. 1. As this finger nears this position the lug 15 of the arm $T^9$ is engaged by the lug 16 of the said finger $Y^2$ and the said arm $T^9$, being journaled on the shaft 12 can rotate independent of any movement of the said shaft. As the arm $T^9$ continues to still further rotate it oscillates the arm carrying the lug $T^8$, by engaging on the under side thereof, until the said lug reaches a position coinciding with the hole $T^{13}$ of the clutch arm F', whereupon it is snapped therein by the spring as shown in Fig. 15 also Fig. 26. The dog 8 on the holder therefor 6 is in continual vertical reciprocation, being operated by the eccentric strap 2', and as the said lug $T^8$ when in and through the hole aforesaid in the arm F' (the clutch moving arm for jaw E') is in the path of the dog 8 in its upward movement the said dog will therefore engage on the under side of the said lug and oscillate the clutch moving arm F' which will close the clutch jaws E' and E. The radial lines $f'$ and $f$ in Fig. 14 represent the oscillation of the arm F' in closing the clutch jaws aforesaid.

The worm D on the prime shaft C will now rotate and the worm wheel D' operated thereby will move the shaft S down through the cam M, levers K and $e''''$. Immediately the clutch jaws E' and E are closed as set out, the link V'' will close the valve V and stop the flow of unseparated material into the basket; likewise simultaneously with this clutch engagement the link $R^3$ will pull the segmental rack from radial line R'', the high separating speed position of the controller, to $R^9$, the slow basket cleaning speed for the motor; simultaneously with the downward movement of the basket shell and bottom the basket brake $A^{28'}$ is applied to the brake ring $A^{30}$, whereby the speed of the basket is quickly reduced from separating speed of about 1200 R. P. M. to the basket cleaning speed of about 100 R. P. M. Simultaneously with the going down of the basket the cleaner carrying shaft H''' is lowered through the lever H'', link I' arm J shaft L, arm K and cam M.

The cam G' is so adjusted that while the cam M holds the bottom of the basket at rest the cleaner is oscillated to cleaning position shown in section in Fig. 4 and in plan at radial line $A^4$, Fig. 7: The separated solids are then instantly thrown on the bottom of the basket, as shown in Fig. 4 and pass through the exposed ports, from the fact that the basket ring proper rests on the balls $A^{44}$ through the under supporting frame therefor $A^{45}$, while the basket bottom fixed to the basket shaft S is carried down to the limit of downward movement of the said shaft.

The cam M on shaft H is meanwhile in slow rotation and after the cleaner H''' has cleaned the solids out of the basket at slow speed the said cam raises the shaft S and also the shaft I of the cleaner support, the latter after first being rotated back to normal position as shown in Fig. 1. After the worm wheel D' has almost completed a full rotation the dog $n$ pivoted thereon will engage the end lug on the link $n^5$, shown in dotted line Fig. 15. This link after being so engaged will oscillate the bell crank lever (shown in the dotted line same figure) T—T' and by this oscillation pass the rod $n^{10}$ into the radial slot $T^{24}$ of the clutch moving compound lever arm F'. The dog 8' is supported by the same elements which support the dog 8 and likewise so operated, the former, it will be recalled, acting upward to close the clutch jaws E' and E, the latter acting downward to open the same clutch jaws. The interponent $T^{15}$, Figs. 24 and 25, is always in the path of the dog 8' when the lever $T^{14}$ is oscillated to its down limit, as shown in Fig. 19 and immediately the rod $n^{10}$ is pushed into the radial slot $T^{24}$ by the link $n^5$, as set out, the spring $T^{33}$, Fig. 19, will engage the lever $T^{14}$ and oscillate the rod $T^{19}$, which connects this lever with the said interponent, and thus brings the latter in the path of the downward moving dog 8', which path is indicated at $T^{18}$, Fig. 24. As the shaft $T^{19}$ is journaled to the compound clutch moving lever F' the clutch jaws E' and E are opened by the arm F' oscillating from line 20 to line 21, Fig. 19, being the same movement as indicated by lines $X^4$ to $X^5$, Fig. 16, $f$ to $f'$, Fig. 14 and Y to Y', Fig. 16. The oscillation of the arm $R^{13}$ from Y to Y' has no effect on the segmental rack $R^2$. This oscillation merely moves the pivot pin $R^{14}$ to the limit of the slot $R^{12}$ in the link $R^3$.

The clutch formed by the jaws $R^6$ and $R^{10}$ is always put in engagement when the clutch jaws E and E' are separated, therefore as the arm $R^{13}$ is moved from radial line Y to Y' the link T⁶ will oscillate the bell crank lever T⁴ from radial line $r$ to $r'$ and thus close the jaws R⁶ and R¹⁰, and as the worm wheel R⁷ is in continual rotation, but it engages the terminal of the arm 21 only when the latter is in the position indicated by the radial line $r''''$ and as this is the position only at slow motor speed it is so engaged at this position of the controller operating segment. Therefore when the clutch jaws R⁶ and R¹⁰ are engaged the lug R⁸ will engage the end of the lever R²¹ and through the link R²² swing the segmental rack R² from position R⁹ the slow motor speed for basket cleaning to R'' the high separating speed for separating, best shown in Fig. 2. The lever R²¹ and the link R²² are shown in dotted lines in Fig. 15. During the movement just described the slack R¹² in the link R¹³ follows the pin R¹⁴, the said pin being at radial line Y'. When the lever R¹³ is oscillated as set out the link R³ will again reduce the speed of the motor through the controller and all the operations described will be repeated continuously and automatically.

The moving of the finger during the period of high separating speed winds the chain R²⁴ on the drum R⁴, Figs. 2 and 15, and as the weight R²³ rests on a fixed support R²⁵, this weight reseats the finger Y² through the shaft 12 and the gears shown thus connecting the said finger with the chain drum and through which elements it is reseated to any position at which it was set to predetermine the period for separating. The dog $n$ on the worm wheel D' is yielding and the set screw 24 on the arm F'', Fig. 14 engages the plate $n^8$ of the link $n^5$ and swings the latter to the dotted position A⁷², disengaging the hooked end of the link $n^5$ and permitting the spring $n''$ to snap the dog under the said hook thus leaving the worm wheel D' ready for the next rotation.

I do not limit myself to the specific structure shown in any instance but could make numerous modifications of elements and elemental relations without departing from the spirit of my invention.

It is well to note that in Fig. 1 and in Figs. 4, 5, 6 and 9 SW indicates the solid wall of purged material and LW the liquid wall during separating, the liquid traveling in the direction of the arrows. L F in Fig. 1 indicates the flow of the unseparated material to the basket and in Fig. 4 L S indicates the discharge of the separated solids.

A⁶⁰' is a scraper frame and on which is mounted the scraper A⁶¹ for removing the separated solids as they are delivered from the machine (Fig. 7).

In Fig. 31 I show the top of my basket shaft in driving relation to the motor shaft. As the shaft S descends for unloading this shaft moves vertically, but the motor remains stationary. I therefore, provide a sleeve S⁵ and key it to the armature shaft S⁷ of the motor. The basket shaft is square at its end S⁶ and the sleeve S⁵ on the motor armature S⁷ has a square hole of greater area than the end of the shaft. Therefore as the shaft is rotated and oscillated, as described, the end of the said shaft can move vertically while in rotative oscillation. The upper position of the shaft is shown at S⁹ and the lower at S¹⁰.

The lines C²², C²², in Fig. 28 show the horizontal position of the bottom as it contacts with the plate during separation and the line C²⁴, C²⁴ shows the position of the bottom A¹¹ while the solids are being cleaned from the chamber and the machine. The area of the discharge ports for these solids is shown at the openings A³⁹' and at 1°, 1°, 1°, 1° and indicate the efficiency of the egress ports for solids discharge.

The rings A⁹ and A¹⁰ forming the trap on the top of the basket are separated as shown in Fig. 29 by spacing pipe sections C²⁰, C²⁰ and rivets C²¹, C²¹ passing therethrough. Of course there are many specific ways I could separate these rings. As long as they are separate and form a liquid conductor and trap they respond to the requirements of my invention.

The outer of the ring rivets is riveted or secured to the top ring C²⁶ of the basket and is made longer for such purpose.

It is scarcely necessary to note that radial lines X⁵ and X⁴ in Fig. 16 correspond with the lines $f'$ and $f$ respectively in Fig. 14.

In this Fig. 14 only A⁷⁰ is a friction brake pivoted to arm R¹³ and frictionally engaged with support A⁷¹. A set screw A⁷² holds the former to the latter frictionally. This brake is to hold the clutch jaws E and E' in the position in which they are placed, open or closed and to insure the operation of the elements they control in obedience to the law of their action.

Many tests have demonstrated the fact that in separating a solid from a liquid in an imperforate basket, thus doing the work by centrifugal force that is accomplished by a draining fabric through a pumping force, in fabric filtering machines, it is necessary to cage the material while separating for a more or less time. This time varies with the difference in the specific gravity of the liquids and the solids associated. To make this more clear we will assume that under ordinary conditions of gravity settling a solid will settle on the bottom of a vessel in two hours in a liquid in which the said solid is suspended. We will further assume that we accelerate the gravity of the mass in an imperforate centrifugal basket 1000 times, or one pound on entering the basket will exert a force of 1000 pounds at the inner perimeter of the basket shell on which it becomes impacted. Two hours contain 7,200 seconds, the amount of time required to settle the solids in an ordinary vessel unaided except by the laws of gravity. My separation will take place in one thousandth part of the 7,200 seconds, or .7.2 seconds of time. Now if I did not cage the material the entire mass would fly out over the top of the basket and no practical separation would be accomplished. To anticipate this necessity I cage the mass by placing over the basket top the concentric ring $A^9$. The wall of the liquid will therefore rest on the wall of the solids until a sufficient volume of solids is formed on the wall when the liquid will pass through the trap formed by the two disks $A^9$ and $A^{10}$, as shown in Figs. 5 and 1. This trap is a matter of vital importance to the successful operation of my machine, as without it no results could be accomplished of any practical value. In some instances and on some materials the inner downwardly extending ring part of the trap would be made long to insure proper caging of the mass for the proper amount of time to do efficient work in separating. When the machine is in action the heavier part of the mass is thrown against the basket wall and forces the lighter, or liquid part, out, when it becomes free to pass over the trap, and the machine has the feeding volume adjusted to meet the situation, whether the time required for an effective separation is one second or ten seconds of time. In practice some materials separate much quicker than a test by normal gravity settling would indicate, but the trap is in all cases absolutely essential.

Having now described my invention what I claim as new and desire to secure by Letters Patent is:

1. In a centrifugal separating machine the combination of a basket, means to rotate the said basket at different rates of speed, means to suspend the basket permitting an eccentric motion thereto at high speed and means to arrest this eccentricity at slow speed.

2. In a centrifugal machine the combination of a basket, means for giving the said basket two speeds the high a separating speed, the slow a cleaning speed for filtered solids, means for permitting an eccentric motion to the said basket at the high speed and means for arresting this eccentricity at slow speed.

3. In a centrifugal separating machine the combination of a basket, means for rotating the said basket at high separating speed, means for permitting eccentric motion to the said basket at the said high speed, a bearing, a basket shaft, said basket supported on the said shaft, means for removing the said shaft from the said bearing at high speed and means for putting the said shaft in the said bearing at slow speed.

4. In an automatic centrifugal separating machine the combination of a basket, means for rotating the said basket, a shaft for the said basket, means for suspending the said shaft, means to permit the said basket shaft to move eccentrically at high speed, a bearing, means to remove the said shaft from the said bearing at high speed, means to put the said shaft in to the said bearing at slow speed and means for lubricating the said shaft when in the said bearing.

5. In an automatic centrifugal separating machine the combination of a basket, means to rotate the said basket at a high separating speed, means to feed the unseparated material to the basket while so rotating, means to permit of eccentric motion to the said basket during this high separating speed, means to arrest the eccentric motion of the basket after the solids and liquids are separated, means to clean the solids collected in the basket therefrom after being so separated and the eccentricity of basket rotation is arrested.

6. The combination in a centrifugal separating machine of a basket, means to rotate the said basket at high or separating speed, means to permit of eccentric motion to the said basket during high separating speed, means to arrest the eccentricity of motion after solids and liquids are separated and means to clean the basket when the eccentricity is so arrested.

7. The combination in a centrifugal separating machine of a basket having an imperforate shell, means to rotate the said shell at high or separating speed, a liquid conductor carried by the basket on the top thereof wherethrough liquid as separated can be passed, means to permit of eccentric motion to the said basket during high separating speed and means to arrest this motion of eccentricity after the solids and liquids are separated.

8. The combination in a centrifugal separating machine having a basket comprising an unperforated wall or shell of a trap carried by the said basket for solids retaining and permitting liquid passage, means for giving the said basket a high separating speed, means for indicating and predetermining the said speed period, a connection between the high speed producing means and the indicator operating means by which the time of the said speed operating means is controlled, during which high speed the solids are walled on the said shell and the liquids are passed through the said trap, means for permitting eccentricity of movement to said basket at high speed and means for arresting this movement at a predetermined point in the cycle of the machine, a cleaning device and means for giving the said basket a predetermined slow speed and means for putting the said cleaning device in action at the said slow speed.

9. The combination in a centrifugal separating machine having an unperforated wall or shell for its basket, of a trap carried by the said shell at the top thereof for solids retaining and liquid wall permitting, means to give the said basket a high separating speed, means to permit eccentricity of motion to said basket at said high speed, means to arrest this eccentricity and means to reduce the speed of the basket when eccentricity is so arrested.

10. In a centrifugal separating machine the combination of a basket having an unperforated chamber wherein unseparated material is temporarily retained during the separation of the solids from their associated liquid, a liquid wall predetermining ring concentric with the basket center, a trap carried by the said ring, and forming thereby a liquid conductor for separated liquid and means to permit said basket having eccentric motion during the separating period of its action and means to resist eccentricity of basket movement at a predetermined time in the cycle of the machine.

11. In a centrifugal separating machine the combination of a basket having an unperforated shell, means to feed the said basket, means to rotate the said basket at high separating speed, means to permit of liquid passage over the top of the said basket while the solids are being separated therefrom, means to predetermine a period for solids impacting on the shell wall, comprising an indicator, means to operate the said indicator, the said means for rotating the said shell at high speed being controlled by the said indicator, but comprising an independent source of power from that for operating the indicator, means to permit of eccentricity of motion of the basket shaft at high speed and means to arrest this eccentricity of motion at a predetermined point in the cycle of the machine.

12. In an automatic centrifugal separating machine, the combination of a basket, means to feed the basket automatically, means to predetermine a time for feeding the said basket, means to vary this time, means to give the said basket a high or purging speed comprising a motor, a motor controller and a regulator for the said controller, means to conform the time of this speed with the time for feeding the said basket, and means to clean the basket of purged solids after the time for feeding and purging has expired and means for reducing the speed of the said basket during the time for cleaning, as set out.

13. The combination in an automatic centrifugal filtering machine of a basket, means to rotate the said basket at a predetermined high speed, means for feeding the said basket at high speed, means to permit of eccentric movement during this speed, means for predetermining a time for high speed comprising an indicator mechanism and means controlled by the indicator for regulating the basket rotating mechanism, means for predetermining a time for basket feeding, means to predetermine a time for basket cleaning, a primary cleaning device by which filtered material is discharged from the basket zone, means to arrest eccentricity of rotation while the cleaning device is in action, and a supplemental cleaning device by which material after being passed from the basket zone is discharged from the machine.

14. The combination in a centrifugal separating machine of a basket, means to give the said basket two predetermined speeds, the high its separating speed and the low its solids discharging speed, a flexible connection between the basket operating means and the basket thus permitting eccentricity of basket rotation at high speed and means to arrest this eccentricity at the slow speed.

15. The combination in a centrifugal separating machine of a basket having an unperforated wall, means to rotate the said basket at high separating speed, means to rotate the said basket at a slow cleaning speed, means to permit the separated liquid to pass out over the top of the said basket shell at high speed, means to permit of eccentricity of motion of the said basket at said high speed, egress passageways for solids discharge normally sealed, means for exposing the said passageways at slow speed and means for arresting eccentricity of rotation for the said basket while said passageways as set out are exposed.

16. The combination in a centrifugal separating machine of a basket, means to rotate the said basket at a high separating speed, means to permit of eccentric motion at the said speed, egress passageways for solids discharge in said basket, said passageways sealed during high speed, means to arrest the eccentricity of basket movement at a predetermined time and means to decrease velocity of rotation at the same time.

17. In an automatic continuous centrifugal separating machine, the combination of a basket, a basket shaft, a motor for operating the said shaft, a controller for the motor, a timing device for controlling the time of basket purging, an automatic mechanism between the timing device and the motor controller, whereby the speed of the motor is controlled and regulated by the said timing device.

18. The combination in an automatic centrifugal separating machine of a basket, a basket shaft, a motor, a motor controller, said motor having two predetermined speeds regulated by the controller, a prime shaft and a mechanical connection between the controller and the prime shaft wherethrough the said two speeds are controlled.

19. The combination in an automatic centrifugal separating machine, of a basket, a motor, a basket shaft operated by the said motor, a motor controller, said motor giving to the said shaft variable speeds and said controller giving to the said motor like variable speeds, a prime shaft, a timing mechanism operated by the said prime shaft and a mechanical connection between the said timing mechanism and the said controller, wherethrough the said variable speeds to motor and basket shaft are controlled.

20. The combination in a centrifugal separating machine of a basket, a motor, said basket operated by the said motor by suitable connections, a variable speed controller automatically controlling the said motor and giving the said motor two predetermined speeds, the one a high separating speed, the other a low or basket cleaning speed and an automatic brake, said brake operated at a predetermined time to arrest the high speed of the motor and basket and reduce the said speed to the predetermined low.

21. The combination in an automatic centrifugal separating machine of a basket, a motor for operating the said basket, a motor controller, a timing mechanism for automatic motor control, a means for operating the said timing mechanism and a mechanical connection between the said timing mechanism and the said controller wherethrough the speed of the motor is controlled, as set out.

22. The combination in an automatic continuous centrifugal separating machine of an electrical motor, a motor controller, a timing device for high motor speed, field and armature resistances and mechanical means controlled by the said timing device for controlling the said resistances through the said controller, whereby the time for separating speed can be regulated and predetermined, as set out.

23. The combination in an automatic continuous centrifugal separating machine of a basket, a motor for operating the said basket, means for giving the said basket operating means two speeds, the high a filtering speed and the low a solids cleaning speed, means operated automatically but independent of the basket operating means for controlling the speed of the basket comprising an adjustable indicator, a motor controller and a connection between the indicator mechanism and the said controller, whereby the latter is controlled by the former.

24. In an automatic continuous centrifugal separating machine the combination of a basket, a motor for giving the said basket a preindicated and predetermined high separating speed, means to control the period of the high speed of the basket and to give the basket a predetermined slow speed, said means comprising a motor controller, automatically operated means to control the controller, and means to clean the basket at the said slow speed.

25. The combination in an automatic continuous centrifugal separating machine of a basket, means to rotate the said basket comprising a motor, a motor controller, a basket bottom, a shaft to which the said bottom is fixed, a prime shaft, a basket bottom raising device operated by the said prime shaft through intervening mechanism, and automatic means to control the motor controller, as and for the purpose set out.

26. The combination in an automatic continuous centrifugal separating machine of a basket, means to rotate the said basket comprising a motor, a motor controller, means to control the controller comprising a timing device and a mechanical connection between the timing device and the controller, a basket bottom, means for lowering the basket bottom at a predetermined time in the cycle of the machine, a shaft to which the said bottom is fixed, a cleaning device for said basket, means to raise and lower the said cleaning device, means to put the said cleaner in cleaning action at a predetermined point in the cycle of the machine and when the bottom of the basket has been lowered, means to put the said device out of action at a predetermined time in the cycle of the machine.

27. The combination in an automatic continuous centrifugal separating machine of a basket, means for operating the said basket at a predetermined high separating speed, means for operating the said machine basket at a preindicated and predetermined slow or solids cleaning speed comprising a motor, field and armature resistance and a common means for controlling and operating the said resistances, and a brake for arresting the high speed automatically applied at a predetermined time.

28. In an automatic continuous centrifugal separating machine the combination of a basket, means to give to the said basket two predetermined speeds, the high a filtering speed, the low a solids cleaning speed, a motor for said basket, a controller for said motor, said controller having field and armature resistances and a common means for controlling the said resistances, means to automatically apply a brake to said basket in speed reduction and means to automatically release said brake at speed acceleration, as and for the purpose set out.

29. The combination in a centrifugal separating machine of a basket, a trap carried by the said basket, means for rotating the said basket, said trap comprising a horizontal channel carried by the basket having an outward deflecting annular portion, whereby separated liquid is thrown downward after being conducted from the basket, and means for permitting and regulating eccentricity of basket rotation.

30. The combination in an automatic continuous separating centrifugal machine of a basket, a basket shaft, means for rotating the shaft at a high predetermined speed, means for supporting the said shaft suspended at such high predetermined speed, a bearing for the said shaft at the end opposite to the suspending means, and means for putting the said shaft into the said bearing at a predetermined point in the cycle of the machine and means for removing the shaft from said bearing at a predetermined time.

31. In an automatic continuous separating centrifugal machine, a basket, a shaft therefor, means for suspending the said basket, means for rotating the said basket at variable speeds, means for holding the said basket free for eccentric rotation at high speed, means for arresting this eccentric shaft rotation at slow speed compelling concentric shaft rotation at slow or reduced speed.

32. In an automatic centrifugal separating machine the combination of a basket, means to rotate the said basket eccentrically, a timing mechanism for predetermining separating periods, means to actuate the said timing mechanism, a feeding mechanism controlled by the said timing mechanism, a cleaning mechanism designed to act after feeding and comprising a basket wall scraper pivotally arranged, means to put the said scraper into the basket separating zone, means to oscillate the said cleaner to basket wall contact during cleaning, means to oscillate the said cleaner from the said wall after cleaning, and means to put the said cleaner out of the separating zone of the basket.

33. The combination in a centrifugal separating machine of a basket, means to rotate the said basket at two predetermined speeds, means to feed the basket with unseparated material at high speed, means to clean the basket of separated solids at slow speed, a timing device to regulate the basket feeding and basket rotation, means to permit eccentricity of rotation at high speed and means to resist this eccentricity at the slow speed.

34. In a centrifugal separating machine the combination of a basket having two fixed speeds, the high its separating speed, the slow its solid cleaning speed, a common means for giving the said basket the said speeds, means for arresting the speed of the basket operating means, means for controlling the time for said speeds, means to vary this time, means to feed the basket at high speed, means to clean the basket at slow speed of separated solids, means to permit the said basket to rotate eccentrically at high speed and means to arrest eccentric motion at slow speed.

35. The combination in an automatic centrifugal separating machine of a basket, said basket having two fixed and predetermined speeds, the high being its separating speed and the low its solid discharging speed, means to automatically control the speed reduction, means to regulate and vary the period for separating speed, comprising a speed controller and a regulating device for the controller, means to permit of eccentricity of basket rotation at high speed and resist this eccentricity at the slow speed.

36. The combination in a centrifugal separating machine of a basket, means to rotate the said basket, a bottom for the said basket, a trap carried by the top of the said basket having a liquid conducting means as part thereof, a curb chamber in which the said basket is located, a top carried by the said chamber and a downward projecting ring carried by the said curb top $a^{60}$ within the rotary zone of the basket trap and means to permit and regulate eccentricity of basket rotation.

37. In a centrifugal the combination of a basket having a shaft with means to give the said shaft two predetermined speeds, means to support the said shaft permitting eccentricity of rotation, comprising a concavo-convex ball bearing carrier, a secondary thrust bearing and a conjointly acting shaft journal, the said secondary thrust bearing carrying the basket at slow speed and the shaft supporting journal carrying the shaft and the basket at the high speed.

38. The combination in a centrifugal separating machine of a basket having an unperforated shell, means to rotate the said basket, a concentric trap carried by the said basket whereby unseparated material is temporarily retained in the basket during separating, a liquid conductor wherethrough separated liquids are conducted from the basket as separated, means for permitting the basket to have eccentric motion while the separating of the liquid is taking place and means to arrest the eccentricity at a predetermined time.

39. In a centrifugal machine the combination of a basket having an unperforated shell, a trap carried by the said basket at the top thereof, a liquid conductor, a curb chamber inclosing the said basket, having a top, a downwardly projecting inner ring carried by the said curb top and a downward projecting outer ring carried by the said trap and means for rotating the said basket.

40. The combination in a centrifugal separating machine of a basket, means to rotate the said basket eccentrically for a predetermined function and means to arrest the eccentricity of motion at a predetermined time.

41. In a centrifugal separating machine the combination of a basket having an unperforated basket shell, means to operate the basket at high separating speed comprising a motor, means to reduce the speed of the basket to a predetermined slow comprising a motor controller and an auxiliary brake, means to conduct the drained liquid out of the basket over the top thereof at the high speed and means to discharge the solids from the basket at slow speed.

42. In a centrifugal machine the combination of a basket having an unperforated shell, means to rotate the said basket, at high speed, a curb chamber in which the said basket is inclosed, a liquid conductor conducting the drained liquid over the basket top and a shield carried by the curb top and passing into the basket zone, whereby the drained liquid is prevented from spraying over the basket top by reflex action.

43. In a centrifugal the combination of a basket, means to rotate the basket at high and low speed, means to permit the rotation of the said basket eccentrically at high speed, means to resist the said eccentricity of the rotation of the basket at a slow cleaning speed, means to clean the basket at the slow speed comprising an oscillating cleaner, means to normally hold the cleaner out of action and out of the centrifugal zone of action, means to put the cleaner into the zone of centrifugal action, means to oscillate the cleaner to contact with the basket wall at the slow speed while cleaning and means to oscillate the cleaner from the basket wall after cleaning.

44. In a centrifugal separating machine, the combination of a basket having a port therein, a cleaning device for the basket, means to intermittently discharge purged solids from said basket through said port, an upright annular wall inclosing the portion of the basket having the port, a wall scraper therefor, a rotatable mounted scraper carrier, a member carried by the basket for actuating said scraper carrier and a support for the scraper carrier concentric with the basket.

45. In a centifugal separating machine having an unperforated basket, means to give the said basket a high speed, means to feed the said basket at high speed, a conductor carrying the separated liquid from the basket over the top thereof at high speed, means to reduce the speed of the basket at a predetermined time to a predetermined slow and means for removing the solids from the said basket while rotating at the said predetermined slow speed, means to permit of basket oscillation at high speed and means to resist this oscillation at slow speed.

46. The combination in a centrifugal separating machine having an imperforated basket shell, means to operate the basket at a separating speed comprising a motor, a motor controller, means to predetermine a period for this speed, comprising an indicator, a speed controller mechanism controlled by the indicator and a connection between the speed controller mechanism and the said motor controller.

47. The combination in an automatic centrifugal of a basket, an electrical motor therefor, a motor controller, means to regulate the controller, means to automatically feed the basket at one period of motor control, means to cut off the basket feed during the remaining cycle of basket rotation, means to permit free eccentricity of rotation during the purging portion of the machine's cycle and means to resist the said eccentricity during the cleaning portion of the machine cycle.

48. In a centrifugal separating machine the combination of a basket, a motor, means to feed the basket with unseparated material at separating speed, means to hold the separating material in the basket for a brief period, means to permit the liquid to pass out the basket over the top thereof automatically and continuously after being so held, comprising a trap carried by the basket in the separating section and a liquid conductor over the trap, a controller for said motor and means to control the controller automatically, whereby from the predetermined high the speed is reduced to a predetermined low at a predetermined time.

49. In a centrifugal separating machine the combination of a basket having an unperforated basket shell, means to rotate the said shell, a trap carried by the said shell having a circumferential conductor with an intake within the basket and having its mouth spaced inwardly from the basket shell, said circumferential conductor having a downward projecting perimetrical flange outside the horizontal zone of the basket shell, said flange co-acting with the liquid conductor in conveying the separated liquid downward after being conducted from the basket by the said conductor.

50. The combination in a centrifugal separating machine of a basket having two speeds with a supporting shaft, means for suspending the said shaft permitting basket eccentricity of rotation at a high speed, a concentric bearing carried by the basket bottom and supporting the basket on a co-acting concentric carrier therefor at the slow speed, as and for the purpose set out.

51. The combination in a centrifugal separating machine of a basket having two speeds, a supporting shaft, means for suspending the said shaft permitting basket oscillation at the high speed portion of its cycle, means to arrest the oscillation at the slow speed portion of its cycle and a basket shell scraper or cleaner, means to put the cleaner in action during the period of the slow speed of the basket and during the period of the arrested oscillation of rotation and means to hold the cleaner out of action during the period of basket oscillation.

52. The combination in a centrifugal separating machine of a basket having an unperforated shell, means to operate the said shell at a high separating speed comprising a motor, a motor controller, means to predetermine the period for this speed, comprising an indicator finger, a dial having period predetermining numerals for high speed indication periods, mechanism for actuating the said finger, and a connection between the finger actuating mechanism and the controller with means to unlock the said finger, means to reseat the said indicator finger after being so unlocked.

53. In a centrifugal separating machine the combination of a basket, means to rotate the said basket at a separating speed comprising a motor, a motor controller, means to conduct the separated liquid out of the said basket over the top thereof during this speed, an indicator mechanism to predetermine a period for separating speed, comprising an indicator finger, a connection between the finger and the controller, means to operate the finger to a predetermined position during separating speed and means to unlock the finger from its operating means when the predetermined position has been reached.

54. In a centrifugal separating machine the combination of a basket having a shell, means to give the said shell a high separating speed, means to control the time of the said speed, means to permit the passing of the liquid out of the basket at the high speed, means to give the basket a slow speed for cleaning, means to pass the solids from the basket at the slow speed, means to permit of eccentricity of basket rotation at high speed and means to resist this eccentricity at the slow speed.

55. In a centrifugal separating machine the combination of a compound motor having field and armature resistances, a basket, a shaft for supporting the said basket and a means for controlling the said resistances and therethrough the motor speed, means to permit eccentricity of rotation of the said basket during a predetermined portion of its cycle and means to arrest eccentricity of rotation during the remaining portion of its rotating cycle.

56. In a centrifugal separating machine the combination of a basket, a motor having field and armature resistances, a motor controller, a basket shaft, a flexible connection between the motor and the basket shaft and a means to control the motor and the controller automatically.

57. In a centrifugal separating machine the combination of a basket, a supporting shaft therefor, a motor, a motor controller, resistances in the motor circuits, mechanical means for operating the said controller whereby the motor is controlled in varied speeds, an auxiliary brake co-acting with the said resistances in speed control and reduction and means for automatically putting the said brake in action at a predetermined point in the cycle of the machine.

58. In a centrifugal separating machine the combination of a motor, means for giving the said motor two speeds, comprising a motor controller, a basket, means for permitting the liquids to pass from the basket at high motor speed, means for connecting the motor with the basket so as to permit eccentricity of basket rotation, means for giving the said motor a slow speed and means for removing the separated solids from the basket at slow motor speed.

59. In an automatic centrifugal machine the combination of a basket, a motor, a motor controller, means to actuate the controller comprising a rack and pinion device and a timing device controlling the action and movement of the said rack.

60. In an automatic centrifugal separating machine the combination of a basket, means to rotate the said basket, means to control the basket rotating means, means to permit of eccentricity of basket rotation during a portion of its cycle and means to feed the basket during eccentricity of basket rotation, means to resist eccentricity of rotation after basket feeding, as set out.

61. In a centrifugal separating machine a basket adapted to rotate at two different speeds and being suspended by a support whereby eccentricity of rotation is permitted at one portion of its rotating cycle, in combination with a means to arrest the eccentric rotation at the remaining portion of its cycle, whereby the shell of the basket will rotate in a fixed plane, a cleaner and means to place and hold the cleaner in scraping contact with the rotating shell during the arrested period of its eccentric rotation.

62. The combination in a centrifugal of the basket, a supporting shaft for the basket and a support for the said shaft permitting of eccentric rotation of the basket during the separating period of its rotation, means to arrest eccentric rotation during the cleaning period of its action and a cleaner, said cleaner comprising a wall scraper and means to swing the said cleaner to wall contact during concentric rotation of the basket and away from wall contact during eccentric basket rotation.

63. The combination in a centrifugal of a basket, means to permit of basket oscillation during the purging period of its cycle, means to arrest this eccentricity during the cleaning period of its cycle and a cleaner carried by a moving element and means to put the said cleaner in scraping basket's shell contact during the period of its arrested eccentricity of rotation.

64. In a centrifugal separating machine, a basket having two independent speeds and two independent rotary movements, a high and a slow speed and an eccentric and concentric rotation, in combination with a cleaner, said cleaner adapted to contact with the shell of the basket during the period of slow speed, and concentric basket rotation only and out of the zone of centrifugal activity during the period of eccentricity of rotation of the basket.

65. The combination in a centrifugal machine of a basket, a cleaner, means to permit the rotation of the basket eccentrically, the said cleaner raised off the basket bottom during the period of eccentricity of basket rotation, means to swing the cleaner to contact with the basket shell during the period of basket concentric rotation, a port in the basket closed during the period of basket eccentric rotation and opened during the period of concentric basket rotation and whereby the material removed from the basket shell during the period of the said port being open is discharged from the basket therethrough by the force of the momentum of the mass.

66. The combination in a centrifugal separating machine of a basket, a supporting shaft therefor, means for supporting the said shaft whereby eccentricity of rotation is permitted, means for arresting eccentric motion at a predetermined time or point in the cycle of the machine and a vertically movable and horizontally oscillatable cleaner adapted to swing into contact with the shell of the basket during the period of arrested basket eccentricity of rotation.

67. In a centrifugal separating machine the combination of a basket having two speeds and means to support the said basket whereby eccentricity of rotation is permitted, means to regulate and control the speed reduction and the eccentricity of rotation, a cleaner and means to put said cleaner in action at speed reduction.

68. The combination in a centrifugal separating machine of a basket having two speeds and a support permitting of eccentricity of rotation, means to reduce the speed and the eccentricity of rotation synchronically and a cleaner with means to put the said cleaner in action after eccentricity and speed are arrested.

69. The combination in a centrifugal separating machine of a basket, means for giving the said basket two predetermined speeds, means for supporting the said basket whereby eccentricity of rotation is permitted, means for reducing the speed of the basket, means for restricting the eccentric motion of the basket and an oscillating cleaner with means to put the said cleaner into the said basket and swing it to the wall of the basket after speed reduction.

70. The combination in a centrifugal separating machine of a basket, means to rotate the said basket eccentrically at high speed, means to reduce the speed and the eccentricity at a predetermined time and means to clean the basket at the said time.

71. The combination in a centrifugal separating machine of a basket, means for rotating the said basket at high speed eccentrically, means for rotating the said basket at slow speed concentrically and a wall scraping cleaner with means to put the said cleaner in action during the concentric rotation of the basket.

72. The combination in an automatic centrifugal separating machine of a basket, means for giving the said basket two speeds, the high its separating speed, means for feeding the said basket at the high speed, means for reducing the speed at a predetermined time, a suspending support for the said basket, a bottom bearing for the said basket but said bearing disengaged from the basket shaft during high speed, means for putting the basket shaft in the said bearing at slow speed and a cleaning mechanism with means to put the said mechanism in action at slow speed after the eccentricity of basket rotation is arrested.

73. In a centrifugal separating machine the combination of a basket having an eccentric motion during the separating period of its cycle, a wall scraper, a supporting shaft therefor, said scraper adapted for oscillation to basket wall contact while cleaning the wall of impacted solids thereon and adapted for oscillation from the said wall after the solids are removed therefrom and means to reduce the speed of the basket and its oscillation during the contact period of the said scraper with the said wall.

74. In a centrifugal separating machine the combination of a basket, means for permitting the rotation of the said basket eccentrically during the separating period of basket rotation, a vertically supported cleaner carried on a shaft, means to oscillate the said cleaner to engagement with the basket wall at the conclusion of its separating period of rotation, means to oscillate the said cleaner away from the said wall and means to arrest the basket oscillation while the cleaner is in action.

75. The combination in a centrifugal of a basket having two speeds, a high speed and a relatively low speed, a supporting shaft for the said basket, a self alining thrust ball bearing support for the said shaft at one end therefor and a fixed concentric bearing at the opposite end of the said shaft and means for maintaining the ball bearing support in elevated position at high speed with the last mentioned end of the shaft removed from the fixed bearing, as and for the purpose set out.

76. The combination in a centrifugal having two speeds for the basket, a supporting shaft for the said basket, a self alining thrust ball bearing support for the said shaft at the one end thereof whereby the basket is supported, a fixed concentric bearing at the opposite end of the said supporting shaft, means for removing the said shaft from the fixed bearing at high speed and means for placing the said shaft in the said fixed bearing at slow speed.

In testimony whereof I have affixed my signature in presence of two witnesses.

HOMER A. HERR.

Witnesses:
 REES C. ROBERTS,
 GEORGE P. SHEPHERDSON.